US012684584B2

(12) United States Patent
Maamari et al.

(10) Patent No.: US 12,684,584 B2
(45) Date of Patent: Jul. 14, 2026

(54) BLIND DECODING IMPROVEMENTS

(71) Applicant: QUALCOMM Incorporated, San Diego, CA (US)

(72) Inventors: Diana Maamari, San Diego, CA (US); Wooseok Nam, San Diego, CA (US); Ahmed Elshafie, San Diego, CA (US); Huilin Xu, Temecula, CA (US); Mickael Mondet, Louannec (FR); Peerapol Tinnakornsrisuphap, San Diego, CA (US)

(73) Assignee: Qualcomm Incorporated, San Diego, CA (US)

( * ) Notice: Subject to any disclaimer, the term of this patent is extended or adjusted under 35 U.S.C. 154(b) by 535 days.

(21) Appl. No.: 18/303,472

(22) Filed: Apr. 19, 2023

(65) Prior Publication Data

US 2024/0357601 A1     Oct. 24, 2024

(51) Int. Cl.
*H04W 72/23*      (2023.01)
*H04L 1/00*       (2006.01)

(52) U.S. Cl.
CPC ........... *H04W 72/23* (2023.01); *H04L 1/0038* (2013.01)

(58) Field of Classification Search
CPC ......................... H04W 72/23; H04W 52/0216; H04L 1/0038; H04L 1/0046; H04L 5/0053
See application file for complete search history.

(56) References Cited

U.S. PATENT DOCUMENTS

| | | | | |
|---|---|---|---|---|
| 2019/0149380 A1* | 5/2019 | Babaei | .................. | H04W 72/23 |
| | | | | 370/330 |
| 2019/0208505 A1* | 7/2019 | Park | ...................... | H04L 5/0053 |
| 2020/0029315 A1* | 1/2020 | Lin | ................... | H04W 52/0216 |
| 2020/0029330 A1* | 1/2020 | Nam | ...................... | H04L 5/0094 |
| 2021/0075571 A1* | 3/2021 | Manolakos | ........... | H04W 72/23 |
| 2021/0160879 A1* | 5/2021 | Lin | ................... | H04W 72/0453 |
| 2021/0212072 A1 | 7/2021 | Lee et al. | | |
| 2022/0264611 A1* | 8/2022 | Yoshimura | ........ | H04W 72/1273 |

(Continued)

OTHER PUBLICATIONS

International Search Report and Written Opinion—PCT/US2024/020350—ISA/EPO—Jun. 28, 2024.

(Continued)

*Primary Examiner* — Ayaz R Sheikh
*Assistant Examiner* — Tarell A Hampton
(74) *Attorney, Agent, or Firm* — Patterson & Sheridan, LLP

(57) ABSTRACT

Certain aspects of the present disclosure provide techniques for bind decoding enhancements. A method performed by a user equipment (UE) includes obtaining control configuration information for receiving downlink control information (DCI) for at least a first link direction and a second link direction, obtaining an indication that only traffic of the first link direction is expected to be communicated in a first period of time, performing, based on the control configuration information, a first number of blind decodes during the first period of time to receive the DCI for the first link direction, and during the first time period, refraining from performing a second number of blind decodes associated with receiving the DCI for the second link direction based on the indication that only the traffic of the first link direction is expected to be communicated in the first period of time.

26 Claims, 10 Drawing Sheets

(56) References Cited

U.S. PATENT DOCUMENTS

| 2023/0164805 A1* | 5/2023 | Matsumura | ........... | H04W 72/30 |
| | | | | 370/329 |
| 2025/0142587 A1* | 5/2025 | Zhao | .................... | H04W 72/30 |

OTHER PUBLICATIONS

VIVO: "Discussion on DCI-based power saving adaptation", 3GPP TSG RAN WG1#102-e, R1-2005391, 3rd Generation Partnership Project, Mobile Competence Centre, 650, Route Des Lucioles, F-06921, Sophia-Antipolis Cedex, France, vol. RAN WG1, No. e-Meeting, Aug. 17, 2020-Aug. 28, 2020, Aug. 8, 2020, 11 Pages, XP052346765, sections 2.1, 3.1 and 3.3.

VIVO: HPDCCH-based power saving signal/channe1H, 3GPP TSG RAN WG1 #97, R1-1906170, 3rd Generation Partnership Project, Mobile Competence Centre, 650, Route Des Lucioles, F-06921, Sophia-Antipolis Cedex, France, vol. RAN WG1, No. Reno, USA, May 13, 2019-May 17, 2019, May 13, 2019, 10 Pages, XP051727624, sections 2.1.3, 2.2.

* cited by examiner

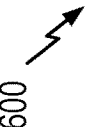

*FIG. 6*

Network Entity 602

UE 604

610 Control configuration information

614 Obtain indication that only traffic of a first link direction is expected to be communicated 612

618 Downlink control information

Perform first number of blind decodes for downlink control information for a first link direction 616

Refrain from performing a second number of blind decodes for downlink control information for a second link direction 620

622 Communicate traffic of first link direction

600

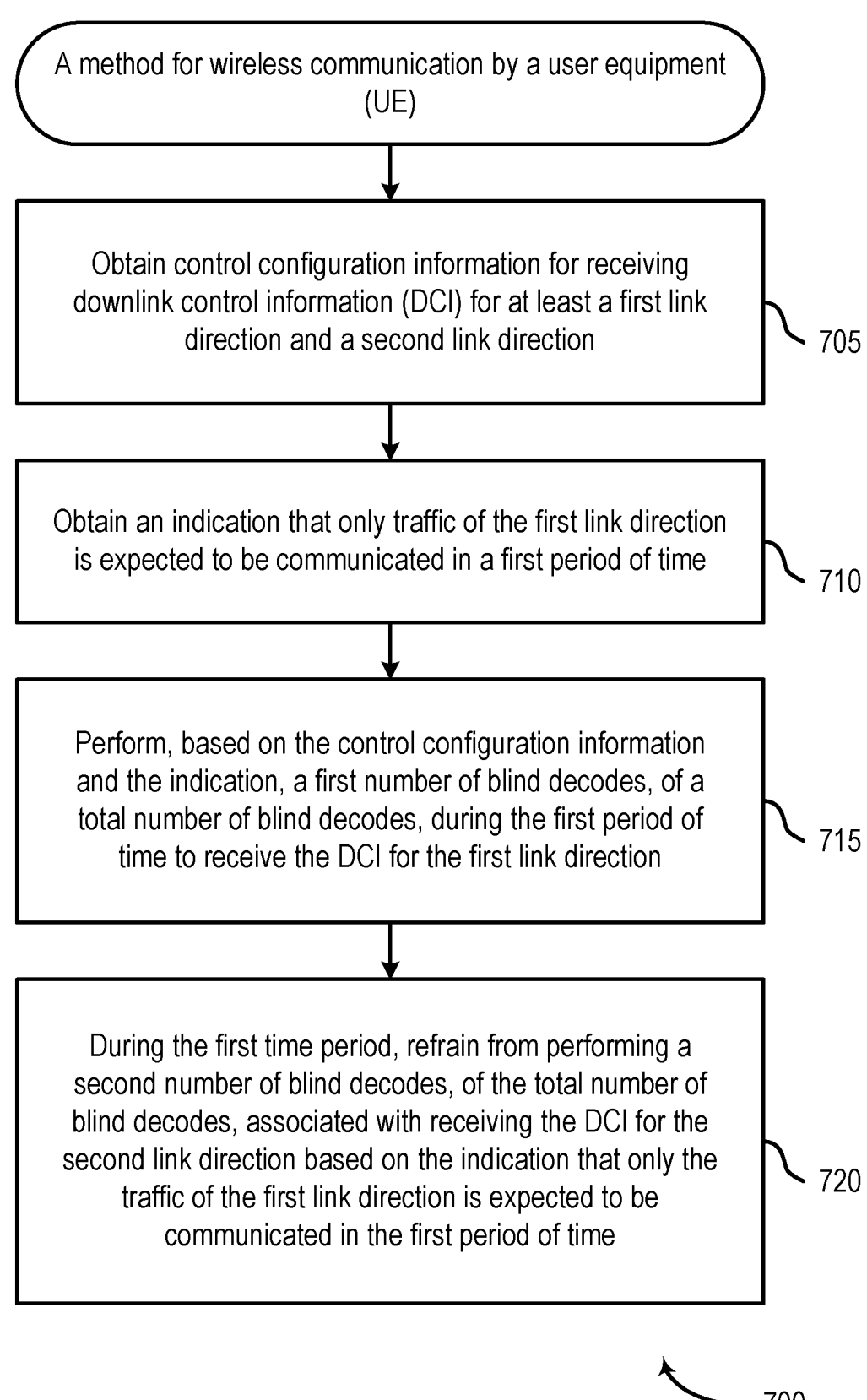

A method for wireless communication by a user equipment (UE)

Obtain control configuration information for receiving downlink control information (DCI) for at least a first link direction and a second link direction — 705

Obtain an indication that only traffic of the first link direction is expected to be communicated in a first period of time — 710

Perform, based on the control configuration information and the indication, a first number of blind decodes, of a total number of blind decodes, during the first period of time to receive the DCI for the first link direction — 715

During the first time period, refrain from performing a second number of blind decodes, of the total number of blind decodes, associated with receiving the DCI for the second link direction based on the indication that only the traffic of the first link direction is expected to be communicated in the first period of time — 720

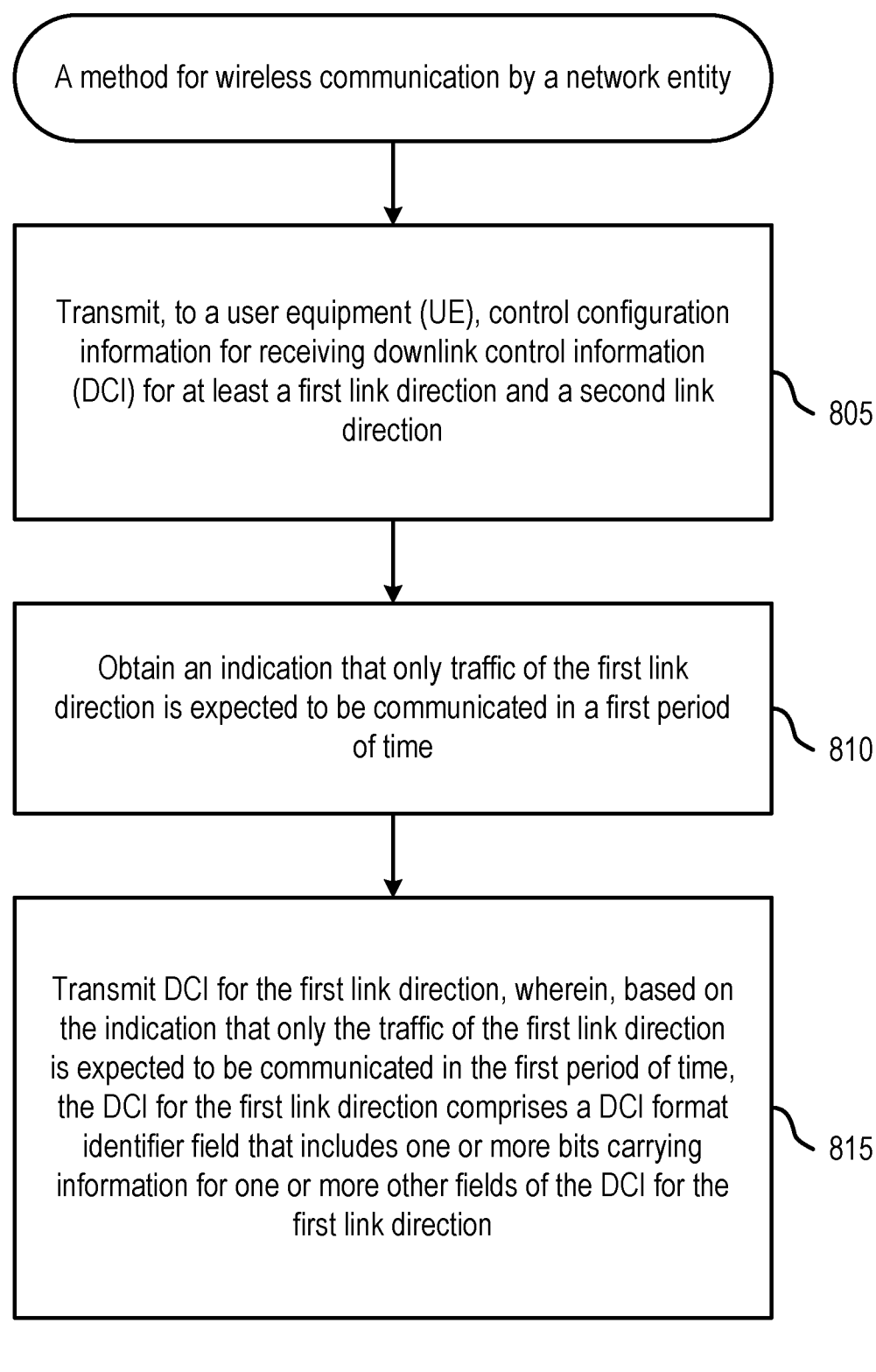

A method for wireless communication by a network entity

Transmit, to a user equipment (UE), control configuration information for receiving downlink control information (DCI) for at least a first link direction and a second link direction

805

Obtain an indication that only traffic of the first link direction is expected to be communicated in a first period of time

810

Transmit DCI for the first link direction, wherein, based on the indication that only the traffic of the first link direction is expected to be communicated in the first period of time, the DCI for the first link direction comprises a DCI format identifier field that includes one or more bits carrying information for one or more other fields of the DCI for the first link direction

1055
Network Interface

1050

1045
Transceiver

1005
Processing System

1040

1010
Processor(s)

1025
Computer-Readable Medium/ Memory

1015
Circuitry for Transmitting

1030
Code for Transmitting

1020
Circuitry for Obtaining

1035
Code for Obtaining

BLIND DECODING IMPROVEMENTS

BACKGROUND

Field of the Disclosure

Aspects of the present disclosure relate to wireless communications, and more particularly, to techniques for improving blind decoding.

Description of Related Art

Wireless communications systems are widely deployed to provide various telecommunication services such as telephony, video, data, messaging, broadcasts, or other similar types of services. These wireless communications systems may employ multiple-access technologies capable of supporting communications with multiple users by sharing available wireless communications system resources with those users Although wireless communications systems have made great technological advancements over many years, challenges still exist. For example, complex and dynamic environments can still attenuate or block signals between wireless transmitters and wireless receivers. Accordingly, there is a continuous desire to improve the technical performance of wireless communications systems, including, for example: improving speed and data carrying capacity of communications, improving efficiency of the use of shared communications mediums, reducing power used by transmitters and receivers while performing communications, improving reliability of wireless communications, avoiding redundant transmissions and/or receptions and related processing, improving the coverage area of wireless communications, increasing the number and types of devices that can access wireless communications systems, increasing the ability for different types of devices to intercommunicate, increasing the number and type of wireless communications mediums available for use, and the like. Consequently, there exists a need for further improvements in wireless communications systems to overcome the aforementioned technical challenges and others.

SUMMARY

One aspect provides a method for wireless communication by a user equipment (UE). The method includes obtaining control configuration information for receiving downlink control information (DCI) for at least a first link direction and a second link direction, obtaining an indication that only traffic of the first link direction is expected to be communicated in a first period of time, performing, based on the control configuration information and the indication, a first number of blind decodes, of a total number of blind decodes, during the first period of time to receive the DCI for the first link direction, and during the first time period, refraining from performing a second number of blind decodes, of the total number of blind decodes, associated with receiving the DCI for the second link direction based on the indication that only the traffic of the first link direction is expected to be communicated in the first period of time.

Another aspect provides a method for wireless communication by a network entity. The method includes transmitting, to a user equipment (UE), control configuration information for receiving downlink control information (DCI) for at least a first link direction and a second link direction, obtaining an indication that only traffic of the first link direction is expected to be communicated in a first period of time, and transmitting DCI for the first link direction, wherein, based on the indication that only the traffic of the first link direction is expected to be communicated in the first period of time, the DCI for the first link direction comprises a DCI format identifier field that includes one or more bits carrying information for one or more other fields of the DCI for the first link direction Other aspects provide: an apparatus operable, configured, or otherwise adapted to perform any one or more of the aforementioned methods and/or those described elsewhere herein; a non-transitory, computer-readable media comprising instructions that, when executed by a processor of an apparatus, cause the apparatus to perform the aforementioned methods as well as those described elsewhere herein; a computer program product embodied on a computer-readable storage medium comprising code for performing the aforementioned methods as well as those described elsewhere herein; and/or an apparatus comprising means for performing the aforementioned methods as well as those described elsewhere herein. By way of example, an apparatus may comprise a processing system, a device with a processing system, or processing systems cooperating over one or more networks.

The following description and the appended figures set forth certain features for purposes of illustration.

BRIEF DESCRIPTION OF DRAWINGS

The appended figures depict certain features of the various aspects described herein and are not to be considered limiting of the scope of this disclosure.

FIG. 6 depicts a process flow including operations for communications in a network between a network entity and a user equipment.

FIG. 7 depicts a method for wireless communications.

FIG. 8 depicts a method for wireless communications.

DETAILED DESCRIPTION

Figure 1:
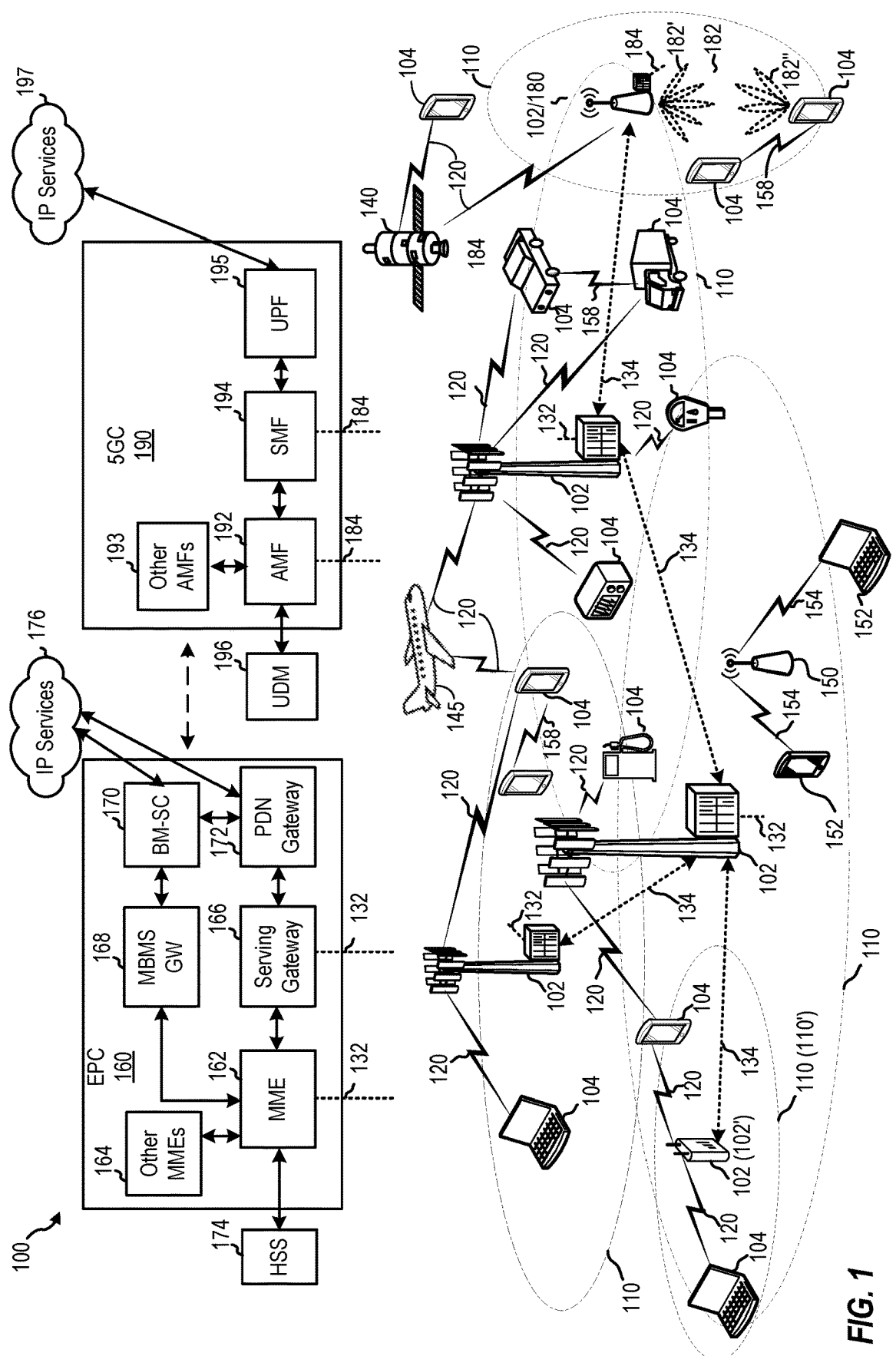
FIG. 1 depicts an example wireless communications network.

Aspects of the present disclosure provide apparatuses, methods, processing systems, and computer-readable mediums for improving blind decoding at a user equipment.

In wireless communication networks, a user equipment (UE) may receive downlink (DL) traffic (e.g., DL data transmissions) from a network entity on a physical downlink shared channel (PDSCH). The UE may also transmit uplink (UL) traffic (e.g., UL data transmissions) to the network entity on a physical uplink shared channel (PUSCH). To communicate UL traffic and DL traffic, the UE may receive downlink control information (DCI) on a physical downlink control channel (PDCCH) from the network entity. The DCI may include scheduling information that indicates time-frequency resources that the UE may use to communicate UL traffic on the PUSCH or DL traffic on the PDSCH. The DCI may be transmitted by the network entity having a particular format, which may depend on whether the DCI includes scheduling information for receiving DL traffic on the PDSCH or scheduling information for transmitting UL traffic on the PUSCH.

Unlike the DL traffic transmitted on the PDSCH and the UL traffic transmitted on the PUSCH, however, the exact time-frequency resources for receiving control channel transmissions on the PDCCH may not be scheduled themselves. Instead, when receiving a control channel transmissions transmitted on a PDDCH, such as the DCI that schedules the DL traffic and UL traffic on the PDSCH and the PUSCH, respectively, a UE may use a technique known as blind decoding to search for the location of control channel resources. Blind decoding involves searching for all possible combinations of control channel resources within a set of pre-defined frequency and time-domain resource blocks called control resource sets (CORESETs).

In some cases, the UE may be configured to perform a separate number of blind decodes for receiving DL-type DCI (e.g., DCI that schedules the UE to receive DL transmissions on the PDSCH) as compared to a number of blind decodes for receiving UL-type DCI (e.g., DCI that schedules the UE to transmit UL transmissions on the PUSCH). However, there may be instances in which UL traffic and DL traffic are communicated asymmetrically, resulting in periods of time in which only UL traffic is transmitted by the UE on the PUSCH and other periods of time in which only DL traffic is received by the UE on the PDSCH. In such cases, during the periods of time in which only UL traffic is expected to be transmitted by the UE, the UE may not expect to receive any DL-type DCI that schedules DL traffic. Similarly, during the periods of time in which only DL traffic is expected to be received by the UE, the UE may not expect to receive any UL-type DCI that schedules UL traffic.

However, even though the UE may not expect to receive any DL-type DCI in a time period in which only UL traffic is expected to be communicated, the UE may still be configured to perform blind decoding for this DL-type DCI, which wastes power resources at the UE having to perform these unnecessary blind decodes for the DL-type DCI. Similarly, even though the UE may not expect to receive any UL-type DCI in a time period in which only DL traffic is expected to be communicated, the UE may still be configured to perform blind decoding for this UL-type DCI, again wasting power resources at the UE having to perform these unnecessary blind decodes for the UL-type DCI.

Accordingly, aspects of the present disclosure provide techniques for improving blind decoding when receiving control information from a network entity. For example, in some cases, these techniques may involve reducing or eliminating performing blind decodes to receive DCI for certain link directions when only traffic associated with another link direction is expected to be communicated within a particular time period. For example, if only UL traffic is expected to be communicated during the particular time period, then the UE may reduce or eliminate performing blind decodes to receive DCI for DL traffic since no DL traffic is expected to be communicated within the particular time period and, as such, no DCIs that scheduled the DL traffic are expected to be received.

In other words, the UE may reduce or eliminate a number of PDCCH decoding candidates that it has to blindly decode for DCI for DL traffic since only UL traffic is expected to be communicated during the particular period of time. In some cases, power consumption at the UE may be reduced by reducing or eliminating performing blind decodes for DCI for certain link directions that are not expected to be communicated within the particular time period. Additionally, because the UE has reduced or eliminated certain blind decodes, there are more opportunities to place the UE in a "sleep" mode, thereby further reducing power consumption at the UE.

Introduction to Wireless Communications Networks

The techniques and methods described herein may be used for various wireless communications networks. While aspects may be described herein using terminology commonly associated with 3G, 4G, and/or 5G wireless technologies, aspects of the present disclosure may likewise be applicable to other communications systems and standards not explicitly mentioned herein.

FIG. 1 depicts an example of a wireless communications network 100, in which aspects described herein may be implemented.

Generally, wireless communications network 100 includes various network entities (alternatively, network elements or network nodes). A network entity is generally a communications device and/or a communications function performed by a communications device (e.g., a user equipment (UE), a base station (BS), a component of a BS, a server, etc.). For example, various functions of a network as well as various devices associated with and interacting with a network may be considered network entities. Further, wireless communications network 100 includes terrestrial aspects, such as ground-based network entities (e.g., BSs 102), and non-terrestrial aspects, such as satellite 140 and aircraft 145, which may include network entities on-board (e.g., one or more BSs) capable of communicating with other network elements (e.g., terrestrial BSs) and user equipments.

In the depicted example, wireless communications network 100 includes BSs 102, UEs 104, and one or more core networks, such as an Evolved Packet Core (EPC) 160 and 5G Core (5GC) network 190, which interoperate to provide communications services over various communications links, including wired and wireless links.

FIG. 1 depicts various example UEs 104, which may more generally include: a cellular phone, smart phone, session initiation protocol (SIP) phone, laptop, personal digital assistant (PDA), satellite radio, global positioning system, multimedia device, video device, digital audio player, camera, game console, tablet, smart device, wearable device, vehicle, electric meter, gas pump, large or small kitchen appliance, healthcare device, implant, sensor/actuator, display, internet of things (IoT) devices, always on (AON) devices, edge processing devices, or other similar devices. UEs 104 may also be referred to more generally as a mobile device, a wireless device, a wireless communications device, a station, a mobile station, a subscriber station, a mobile subscriber station, a mobile unit, a subscriber unit, a wireless unit, a remote unit, a remote device, an access terminal, a mobile terminal, a wireless terminal, a remote terminal, a handset, and others.

BSs 102 wirelessly communicate with (e.g., transmit signals to or receive signals from) UEs 104 via communications links 120. The communications links 120 between BSs 102 and UEs 104 may include uplink (UL) (also referred to as reverse link) transmissions from a UE 104 to a BS 102 and/or downlink (DL) (also referred to as forward link) transmissions from a BS 102 to a UE 104. The communications links 120 may use multiple-input and multiple-output (MIMO) antenna technology, including spatial multiplexing, beamforming, and/or transmit diversity in various aspects.

BSs 102 may generally include: a NodeB, enhanced NodeB (eNB), next generation enhanced NodeB (ng-eNB), next generation NodeB (gNB or gNodeB), access point, base transceiver station, radio base station, radio transceiver, transceiver function, transmission reception point, and/or others. Each of BSs 102 may provide communications coverage for a respective geographic coverage area 110, which may sometimes be referred to as a cell, and which may overlap in some cases (e.g., small cell 102' may have a coverage area 110' that overlaps the coverage area 110 of a macro cell). A BS may, for example, provide communications coverage for a macro cell (covering relatively large geographic area), a pico cell (covering relatively smaller geographic area, such as a sports stadium), a femto cell (relatively smaller geographic area (e.g., a home)), and/or other types of cells.

Figure 2:
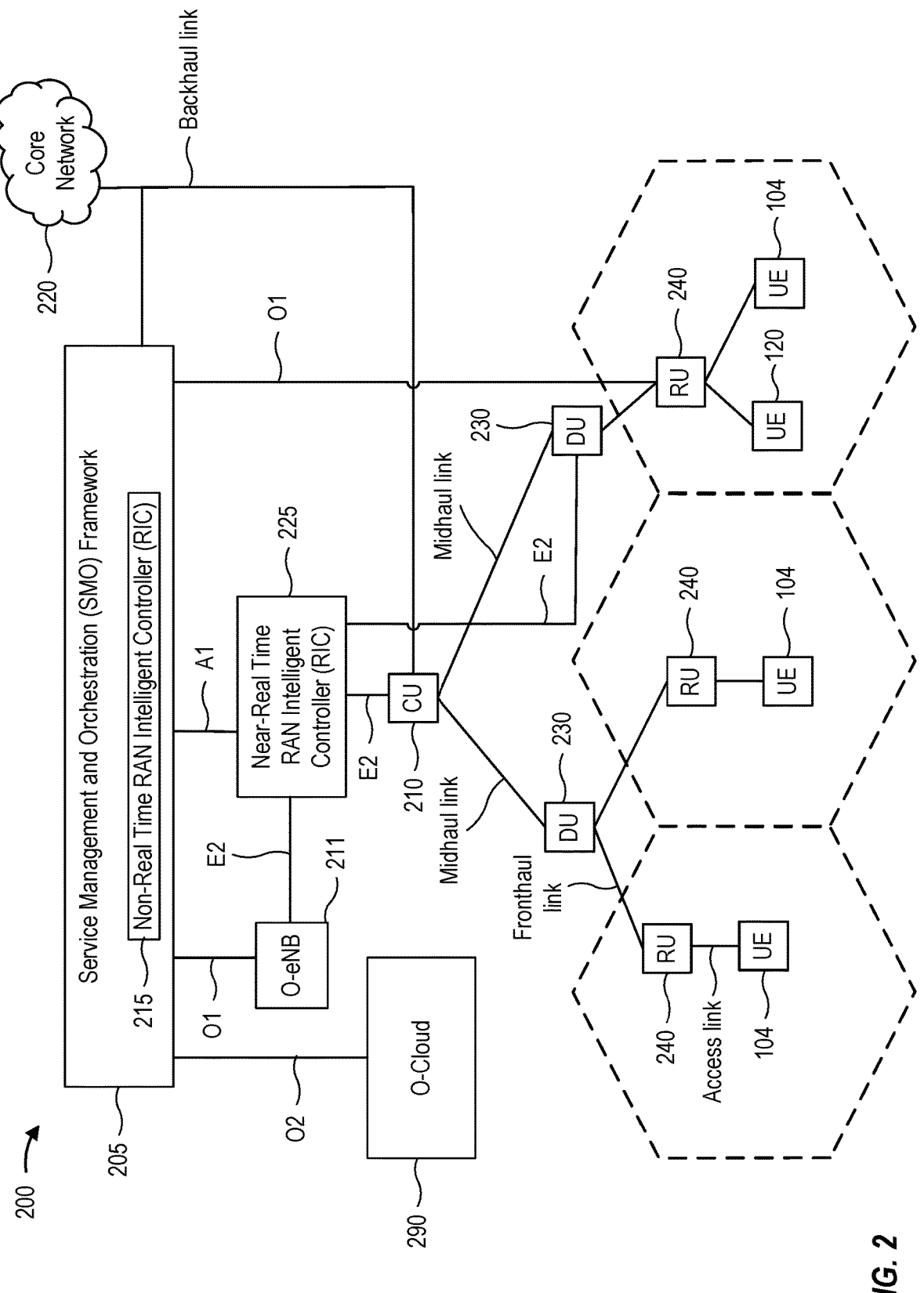
FIG. 2 depicts an example disaggregated base station architecture.

While BSs 102 are depicted in various aspects as unitary communications devices, BSs 102 may be implemented in various configurations. For example, one or more components of a base station may be disaggregated, including a central unit (CU), one or more distributed units (DUs), one or more radio units (RUS), a Near-Real Time (Near-RT) RAN Intelligent Controller (RIC), or a Non-Real Time (Non-RT) RIC, to name a few examples. In another example, various aspects of a base station may be virtualized. More generally, a base station (e.g., BS 102) may include components that are located at a single physical location or components located at various physical locations. In examples in which a base station includes components that are located at various physical locations, the various components may each perform functions such that, collectively, the various components achieve functionality that is similar to a base station that is located at a single physical location. In some aspects, a base station including components that are located at various physical locations may be referred to as a disaggregated radio access network architecture, such as an Open RAN (O-RAN) or Virtualized RAN (VRAN) architecture. FIG. 2 depicts and describes an example disaggregated base station architecture.

Different BSs 102 within wireless communications network 100 may also be configured to support different radio access technologies, such as 3G, 4G, and/or 5G. For example, BSs 102 configured for 4G LTE (collectively referred to as Evolved Universal Mobile Telecommunications System (UMTS) Terrestrial Radio Access Network (E-UTRAN)) may interface with the EPC 160 through first backhaul links 132 (e.g., an S1 interface). BSs 102 configured for 5G (e.g., 5G NR or Next Generation RAN (NG-RAN)) may interface with 5GC 190 through second backhaul links 184. BSs 102 may communicate directly or indirectly (e.g., through the EPC 160 or 5GC 190) with each other over third backhaul links 134 (e.g., X2 interface), which may be wired or wireless.

Wireless communications network 100 may subdivide the electromagnetic spectrum into various classes, bands, channels, or other features. In some aspects, the subdivision is provided based on wavelength and frequency, where frequency may also be referred to as a carrier, a subcarrier, a frequency channel, a tone, or a subband. For example, 3GPP currently defines Frequency Range 1 (FR1) as including 410 MHz-7125 MHz, which is often referred to (interchangeably) as "Sub-6 GHz". Similarly, 3GPP currently defines Frequency Range 2 (FR2) as including 24,250 MHz-71,000 MHz, which is sometimes referred to (interchangeably) as a "millimeter wave" ("mmW" or "mmWave"). In some cases, FR2 may be further defined in terms of sub-ranges, such as a first sub-range FR2-1 including 24,250 MHz-52,600 MHz and a second sub-range FR2-2 including 52,600 MHz-71,000 MHz. A base station configured to communicate using mmWave/near mmWave radio frequency bands (e.g., a mmWave base station such as BS 180) may utilize beamforming (e.g., 182) with a UE (e.g., 104) to improve path loss and range.

The communications links 120 between BSs 102 and, for example, UEs 104, may be through one or more carriers, which may have different bandwidths (e.g., 5, 10, 15, 20, 100, 400, and/or other MHz), and which may be aggregated in various aspects. Carriers may or may not be adjacent to each other. Allocation of carriers may be asymmetric with respect to DL and UL (e.g., more or fewer carriers may be allocated for DL than for UL).

Communications using higher frequency bands may have higher path loss and a shorter range compared to lower frequency communications. Accordingly, certain base stations (e.g., 180 in FIG. 1) may utilize beamforming 182 with a UE 104 to improve path loss and range. For example, BS 180 and the UE 104 may each include a plurality of antennas, such as antenna elements, antenna panels, and/or antenna arrays to facilitate the beamforming. In some cases, BS 180 may transmit a beamformed signal to UE 104 in one or more transmit directions 182'. UE 104 may receive the beamformed signal from the BS 180 in one or more receive directions 182". UE 104 may also transmit a beamformed signal to the BS 180 in one or more transmit directions 182". BS 180 may also receive the beamformed signal from UE 104 in one or more receive directions 182'. BS 180 and UE 104 may then perform beam training to determine the best receive and transmit directions for each of BS 180 and UE 104. Notably, the transmit and receive directions for BS 180 may or may not be the same. Similarly, the transmit and receive directions for UE 104 may or may not be the same.

Wireless communications network 100 further includes a Wi-Fi AP 150 in communication with Wi-Fi stations (STAs) 152 via communications links 154 in, for example, a 2.4 GHz and/or 5 GHz unlicensed frequency spectrum.

Certain UEs 104 may communicate with each other using device-to-device (D2D) communications link 158. D2D communications link 158 may use one or more sidelink channels, such as a physical sidelink broadcast channel (PSBCH), a physical sidelink discovery channel (PSDCH), a physical sidelink shared channel (PSSCH), a physical sidelink control channel (PSCCH), and/or a physical sidelink feedback channel (PSFCH).

EPC 160 may include various functional components, including: a Mobility Management Entity (MME) 162, other MMEs 164, a Serving Gateway 166, a Multimedia Broadcast Multicast Service (MBMS) Gateway 168, a Broadcast Multicast Service Center (BM-SC) 170, and/or a Packet Data Network (PDN) Gateway 172, such as in the depicted example. MME 162 may be in communication with a Home Subscriber Server (HSS) 174. MME 162 is the control node that processes the signaling between the UEs 104 and the EPC 160. Generally, MME 162 provides bearer and connection management.

Generally, user Internet protocol (IP) packets are transferred through Serving Gateway 166, which itself is connected to PDN Gateway 172. PDN Gateway 172 provides UE IP address allocation as well as other functions. PDN Gateway 172 and the BM-SC 170 are connected to IP Services 176, which may include, for example, the Internet, an intranet, an IP Multimedia Subsystem (IMS), a Packet Switched (PS) streaming service, and/or other IP services.

BM-SC 170 may provide functions for MBMS user service provisioning and delivery. BM-SC 170 may serve as an entry point for content provider MBMS transmission, may be used to authorize and initiate MBMS Bearer Services within a public land mobile network (PLMN), and/or may be used to schedule MBMS transmissions. MBMS Gateway 168 may be used to distribute MBMS traffic to the BSs 102 belonging to a Multicast Broadcast Single Frequency Network (MBSFN) area broadcasting a particular service, and/or may be responsible for session management (start/stop) and for collecting eMBMS related charging information.

5GC 190 may include various functional components, including: an Access and Mobility Management Function (AMF) 192, other AMFs 193, a Session Management Function (SMF) 194, and a User Plane Function (UPF) 195. AMF 192 may be in communication with Unified Data Management (UDM) 196.

AMF 192 is a control node that processes signaling between UEs 104 and 5GC 190. AMF 192 provides, for example, quality of service (QOS) flow and session management.

Internet protocol (IP) packets are transferred through UPF 195, which is connected to the IP Services 197, and which provides UE IP address allocation as well as other functions for 5GC 190. IP Services 197 may include, for example, the Internet, an intranet, an IMS, a PS streaming service, and/or other IP services.

In various aspects, a network entity or network node can be implemented as an aggregated base station, as a disaggregated base station, a component of a base station, an integrated access and backhaul (IAB) node, a relay node, a sidelink node, to name a few examples.

FIG. 2 depicts an example disaggregated base station 200 architecture. The disaggregated base station 200 architecture may include one or more central units (CUs) 210 that can communicate directly with a core network 220 via a backhaul link, or indirectly with the core network 220 through one or more disaggregated base station units (such as a Near-Real Time (Near-RT) RAN Intelligent Controller (RIC) 225 via an E2 link, or a Non-Real Time (Non-RT) RIC 215 associated with a Service Management and Orchestration (SMO) Framework 205, or both). A CU 210 may communicate with one or more distributed units (DUs) 230 via respective midhaul links, such as an F1 interface. The DUs 230 may communicate with one or more radio units (RUS) 240 via respective fronthaul links. The RUs 240 may communicate with respective UEs 104 via one or more radio frequency (RF) access links. In some implementations, the UE 104 may be simultaneously served by multiple RUs 240.

Each of the units, e.g., the CUS 210, the DUs 230, the RUs 240, as well as the Near-RT RICs 225, the Non-RT RICs 215 and the SMO Framework 205, may include one or more interfaces or be coupled to one or more interfaces configured to receive or transmit signals, data, or information (collectively, signals) via a wired or wireless transmission medium. Each of the units, or an associated processor or controller providing instructions to the communications interfaces of the units, can be configured to communicate with one or more of the other units via the transmission medium. For example, the units can include a wired interface configured to receive or transmit signals over a wired transmission medium to one or more of the other units. Additionally or alternatively, the units can include a wireless interface, which may include a receiver, a transmitter or transceiver (such as a radio frequency (RF) transceiver), configured to receive or transmit signals, or both, over a wireless transmission medium to one or more of the other units.

In some aspects, the CU 210 may host one or more higher layer control functions. Such control functions can include radio resource control (RRC), packet data convergence protocol (PDCP), service data adaptation protocol (SDAP), or the like. Each control function can be implemented with an interface configured to communicate signals with other control functions hosted by the CU 210. The CU 210 may be configured to handle user plane functionality (e.g., Central Unit-User Plane (CU-UP)), control plane functionality (e.g., Central Unit-Control Plane (CU-CP)), or a combination thereof. In some implementations, the CU 210 can be logically split into one or more CU-UP units and one or more CU-CP units. The CU-UP unit can communicate bidirectionally with the CU-CP unit via an interface, such as the E1 interface when implemented in an O-RAN configuration. The CU 210 can be implemented to communicate with the DU 230, as necessary, for network control and signaling.

The DU 230 may correspond to a logical unit that includes one or more base station functions to control the operation of one or more RUs 240. In some aspects, the DU 230 may host one or more of a radio link control (RLC) layer, a medium access control (MAC) layer, and one or more high physical (PHY) layers (such as modules for forward error correction (FEC) encoding and decoding, scrambling, modulation and demodulation, or the like) depending, at least in part, on a functional split, such as those defined by the 3$^{rd}$ Generation Partnership Project (3GPP). In some aspects, the DU 230 may further host one or more low PHY layers. Each layer (or module) can be implemented with an interface configured to communicate signals with other layers (and modules) hosted by the DU 230, or with the control functions hosted by the CU 210.

Lower-layer functionality can be implemented by one or more RUs 240. In some deployments, an RU 240, controlled by a DU 230, may correspond to a logical node that hosts RF processing functions, or low-PHY layer functions (such as performing fast Fourier transform (FFT), inverse FFT (iFFT), digital beamforming, physical random access channel (PRACH) extraction and filtering, or the like), or both, based on or at least in part on the functional split, such as a lower layer functional split. In such an architecture, the RU(s) 240 can be implemented to handle over the air (OTA) communications with one or more UEs 104. In some implementations, real-time and non-real-time aspects of control and user plane communications with the RU(s) 240 can be controlled by the corresponding DU 230. In some scenarios, this configuration can enable the DU(s) 230 and the CU 210 to be implemented in a cloud-based RAN architecture, such as a vRAN architecture.

The SMO Framework 205 may be configured to support RAN deployment and provisioning of non-virtualized and virtualized network elements. For non-virtualized network elements, the SMO Framework 205 may be configured to support the deployment of dedicated physical resources for RAN coverage requirements which may be managed via an operations and maintenance interface (such as an O1 interface). For virtualized network elements, the SMO Framework 205 may be configured to interact with a cloud computing platform (such as an open cloud (O-Cloud) 290) to perform network element life cycle management (such as to instantiate virtualized network elements) via a cloud computing platform interface (such as an O2 interface). Such virtualized network elements can include, but are not limited to, CUs 210, DUs 230, RUs 240 and Near-RT RICs 225. In some implementations, the SMO Framework 205 can communicate with a hardware aspect of a 4G RAN, such as an open eNB (O-eNB) 211, via an O1 interface. Additionally, in some implementations, the SMO Framework 205 can communicate directly with one or more RUs 240 via an O1 interface. The SMO Framework 205 also may include a Non-RT RIC 215 configured to support functionality of the SMO Framework 205.

The Non-RT RIC 215 may be configured to include a logical function that enables non-real-time control and optimization of RAN elements and resources, Artificial Intelligence/Machine Learning (AI/ML) workflows including model training and updates, or policy-based guidance of applications/features in the Near-RT RIC 225. The Non-RT RIC 215 may be coupled to or communicate with (such as via an A1 interface) the Near-RT RIC 225. The Near-RT RIC 225 may be configured to include a logical function that enables near-real-time control and optimization of RAN elements and resources via data collection and actions over an interface (such as via an E2 interface) connecting one or more CUs 210, one or more DUs 230, or both, as well as an O-eNB, with the Near-RT RIC 225.

In some implementations, to generate AI/ML models to be deployed in the Near-RT RIC 225, the Non-RT RIC 215 may receive parameters or external enrichment information from external servers. Such information may be utilized by the Near-RT RIC 225 and may be received at the SMO Framework 205 or the Non-RT RIC 215 from non-network data sources or from network functions. In some examples, the Non-RT RIC 215 or the Near-RT RIC 225 may be configured to tune RAN behavior or performance. For example, the Non-RT RIC 215 may monitor long-term trends and patterns for performance and employ AI/ML models to perform corrective actions through the SMO Framework 205 (such as reconfiguration via 01) or via creation of RAN management policies (such as A1 policies).

Figure 3:
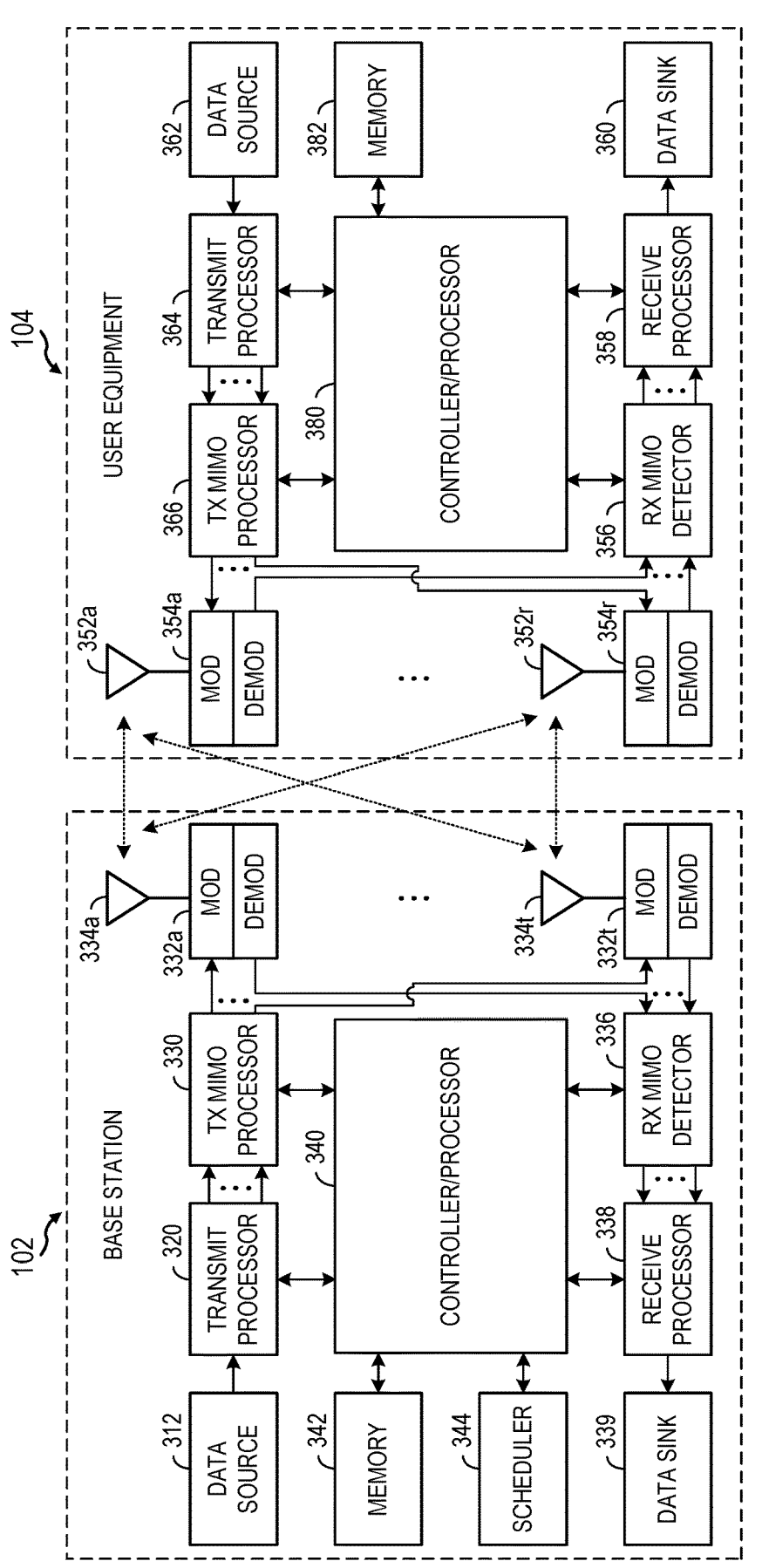
FIG. 3 depicts aspects of an example base station and an example user equipment.

FIG. 3 depicts aspects of an example BS 102 and a UE 104.

Generally, BS 102 includes various processors (e.g., 320, 330, 338, and 340), antennas 334*a-t* (collectively 334), transceivers 332*a-t* (collectively 332), which include modulators and demodulators, and other aspects, which enable wireless transmission of data (e.g., data source 312) and wireless reception of data (e.g., data sink 339). For example, BS 102 may send and receive data between BS 102 and UE 104. BS 102 includes controller/processor 340, which may be configured to implement various functions described herein related to wireless communications.

Generally, UE 104 includes various processors (e.g., 358, 364, 366, and 380), antennas 352*a-r* (collectively 352), transceivers 354*a-r* (collectively 354), which include modulators and demodulators, and other aspects, which enable wireless transmission of data (e.g., retrieved from data source 362) and wireless reception of data (e.g., provided to data sink 360). UE 104 includes controller/processor 380, which may be configured to implement various functions described herein related to wireless communications.

In regards to an example downlink transmission, BS 102 includes a transmit processor 320 that may receive data from a data source 312 and control information from a controller/processor 340. The control information may be for the physical broadcast channel (PBCH), physical control format indicator channel (PCFICH), physical HARQ indicator channel (PHICH), physical downlink control channel (PDCCH), group common PDCCH (GC PDCCH), and/or others. The data may be for the physical downlink shared channel (PDSCH), in some examples.

Transmit processor 320 may process (e.g., encode and symbol map) the data and control information to obtain data symbols and control symbols, respectively. Transmit processor 320 may also generate reference symbols, such as for the primary synchronization signal (PSS), secondary synchronization signal (SSS), PBCH demodulation reference signal (DMRS), and channel state information reference signal (CSI-RS).

Transmit (TX) multiple-input multiple-output (MIMO) processor 330 may perform spatial processing (e.g., precoding) on the data symbols, the control symbols, and/or the reference symbols, if applicable, and may provide output symbol streams to the modulators (MODs) in transceivers 332*a*-332*t*. Each modulator in transceivers 332*a*-332*t* may process a respective output symbol stream to obtain an output sample stream. Each modulator may further process (e.g., convert to analog, amplify, filter, and upconvert) the output sample stream to obtain a downlink signal. Downlink signals from the modulators in transceivers 332*a*-332*t* may be transmitted via the antennas 334*a*-334*t*, respectively.

In order to receive the downlink transmission, UE 104 includes antennas 352*a*-352*r* that may receive the downlink signals from the BS 102 and may provide received signals to the demodulators (DEMODs) in transceivers 354*a*-354*r*, respectively. Each demodulator in transceivers 354*a*-354*r* may condition (e.g., filter, amplify, downconvert, and digitize) a respective received signal to obtain input samples. Each demodulator may further process the input samples to obtain received symbols.

MIMO detector 356 may obtain received symbols from all the demodulators in transceivers 354*a*-354*r*, perform MIMO detection on the received symbols if applicable, and provide detected symbols. Receive processor 358 may process (e.g., demodulate, deinterleave, and decode) the detected symbols, provide decoded data for the UE 104 to a data sink 360, and provide decoded control information to a controller/processor 380.

In regards to an example uplink transmission, UE 104 further includes a transmit processor 364 that may receive and process data (e.g., for the PUSCH) from a data source 362 and control information (e.g., for the physical uplink control channel (PUCCH)) from the controller/processor 380. Transmit processor 364 may also generate reference symbols for a reference signal (e.g., for the sounding reference signal (SRS)). The symbols from the transmit processor 364 may be precoded by a TX MIMO processor 366 if applicable, further processed by the modulators in transceivers 354*a*-354*r* (e.g., for SC-FDM), and transmitted to BS 102.

At BS 102, the uplink signals from UE 104 may be received by antennas 334*a-t*, processed by the demodulators in transceivers 332*a*-332*t*, detected by a MIMO detector 336 if applicable, and further processed by a receive processor 338 to obtain decoded data and control information sent by UE 104. Receive processor 338 may provide the decoded data to a data sink 339 and the decoded control information to the controller/processor 340.

Memories 342 and 382 may store data and program codes for BS 102 and UE 104, respectively.

Scheduler 344 may schedule UEs for data transmission on the downlink and/or uplink.

In various aspects, BS 102 may be described as transmitting and receiving various types of data associated with the methods described herein. In these contexts, "transmitting" may refer to various mechanisms of outputting data, such as outputting data from data source 312, scheduler 344, memory 342, transmit processor 320, controller/processor 340, TX MIMO processor 330, transceivers 332*a-t*, antenna 334*a-t*, and/or other aspects described herein. Similarly, "receiving" may refer to various mechanisms of obtaining data, such as obtaining data from antennas 334*a-t*, transceivers 332*a-t*, RX MIMO detector 336, controller/processor 340, receive processor 338, scheduler 344, memory 342, and/or other aspects described herein.

In various aspects, UE 104 may likewise be described as transmitting and receiving various types of data associated with the methods described herein. In these contexts, "transmitting" may refer to various mechanisms of outputting data, such as outputting data from data source 362, memory 382, transmit processor 364, controller/processor 380, TX MIMO processor 366, transceivers 354*a-t*, antenna 352*a-t*, and/or other aspects described herein. Similarly, "receiving" may refer to various mechanisms of obtaining data, such as obtaining data from antennas 352*a-t*, transceivers 354*a-t*, RX MIMO detector 356, controller/processor 380, receive processor 358, memory 382, and/or other aspects described herein.

In some aspects, a processor may be configured to perform various operations, such as those associated with the methods described herein, and transmit (output) to or receive (obtain) data from another interface that is configured to transmit or receive, respectively, the data.

FIGS. 4A, 4B, 4C, and 4D depict aspects of data structures for a wireless communications network, such as wireless communications network 100 of FIG. 1.

Figures 4A, 4B, 4C, 4D:
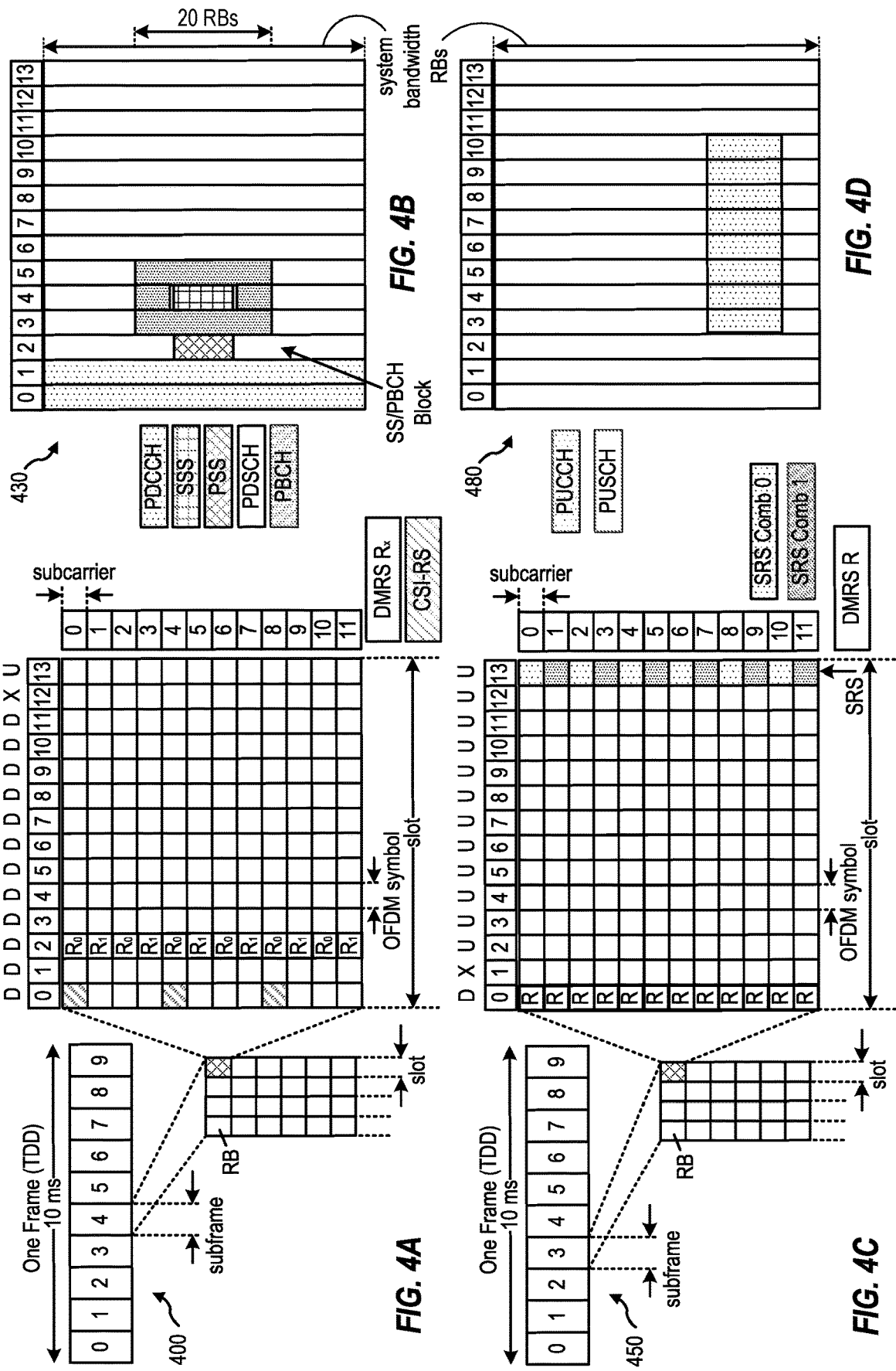
FIGS. 4A, 4B, 4C, and 4D depict various example aspects of data structures for a wireless communications network.

In particular, FIG. 4A is a diagram 400 illustrating an example of a first subframe within a 5G (e.g., 5G NR) frame structure, FIG. 4B is a diagram 430 illustrating an example of DL channels within a 5G subframe, FIG. 4C is a diagram 450 illustrating an example of a second subframe within a 5G frame structure, and FIG. 4D is a diagram 480 illustrating an example of UL channels within a 5G subframe.

Wireless communications systems may utilize orthogonal frequency division multiplexing (OFDM) with a cyclic prefix (CP) on the uplink and downlink. Such systems may also support half-duplex operation using time division duplexing (TDD). OFDM and single-carrier frequency division multiplexing (SC-FDM) partition the system bandwidth (e.g., as depicted in FIGS. 4B and 4D) into multiple orthogonal subcarriers. Each subcarrier may be modulated with data. Modulation symbols may be sent in the frequency domain with OFDM and/or in the time domain with SC-FDM.

A wireless communications frame structure may be frequency division duplex (FDD), in which, for a particular set of subcarriers, subframes within the set of subcarriers are dedicated for either DL or UL. Wireless communications frame structures may also be time division duplex (TDD), in which, for a particular set of subcarriers, subframes within the set of subcarriers are dedicated for both DL and UL.

In FIGS. 4A and 4C, the wireless communications frame structure is TDD where Dis DL, U is UL, and X is flexible for use between DL/UL. UEs may be configured with a slot format through a received slot format indicator (SFI) (dynamically through DL control information (DCI), or semi-statically/statically through radio resource control (RRC) signaling). In the depicted examples, a 10 ms frame is divided into 10 equally sized 1 ms subframes. Each subframe may include one or more time slots. In some examples, each slot may include 7 or 14 symbols, depending on the slot format. Subframes may also include mini-slots, which generally have fewer symbols than an entire slot.

Other wireless communications technologies may have a different frame structure and/or different channels.

In certain aspects, the number of slots within a subframe is based on a slot configuration and a numerology. For example, for slot configuration 0, different numerologies ($\mu$) 0 to 6 allow for 1, 2, 4, 8, 16, 32, and 64 slots, respectively, per subframe. For slot configuration 1, different numerologies 0 to 2 allow for 2, 4, and 8 slots, respectively, per subframe. Accordingly, for slot configuration 0 and numerology u, there are 14 symbols/slot and $2\mu$ slots/subframe. The subcarrier spacing and symbol length/duration are a function of the numerology. The subcarrier spacing may be equal to $2^{\mu} \times 15$ kHz, where u is the numerology 0 to 6. As such, the numerology $\mu=0$ has a subcarrier spacing of 15 kHz and the numerology $\mu=6$ has a subcarrier spacing of 960 kHz. The symbol length/duration is inversely related to the subcarrier spacing. FIGS. 4A, 4B, 4C, and 4D provide an example of slot configuration 0 with 14 symbols per slot and numerology $\mu=2$ with 4 slots per subframe. The slot duration is 0.25 ms, the subcarrier spacing is 60 kHz, and the symbol duration is approximately 16.67 $\mu$s.

As depicted in FIGS. 4A, 4B, 4C, and 4D, a resource grid may be used to represent the frame structure. Each time slot includes a resource block (RB) (also referred to as physical RBs (PRBs)) that extends, for example, 12 consecutive subcarriers. The resource grid is divided into multiple resource elements (REs). The number of bits carried by each RE depends on the modulation scheme.

As illustrated in FIG. 4A, some of the REs carry reference (pilot) signals (RS) for a UE (e.g., UE 104 of FIGS. 1 and 3). The RS may include demodulation RS (DMRS) and/or channel state information reference signals (CSI-RS) for channel estimation at the UE. The RS may also include beam measurement RS (BRS), beam refinement RS (BRRS), and/or phase tracking RS (PT-RS).

FIG. 4B illustrates an example of various DL channels within a subframe of a frame. The physical downlink control channel (PDCCH) carries DCI within one or more control channel elements (CCEs), each CCE including, for example, nine RE groups (REGs), each REG including, for example, four consecutive REs in an OFDM symbol.

A primary synchronization signal (PSS) may be within symbol 2 of particular subframes of a frame. The PSS is used by a UE (e.g., 104 of FIGS. 1 and 3) to determine subframe/symbol timing and a physical layer identity.

A secondary synchronization signal (SSS) may be within symbol 4 of particular subframes of a frame. The SSS is used by a UE to determine a physical layer cell identity group number and radio frame timing.

Based on the physical layer identity and the physical layer cell identity group number, the UE can determine a physical cell identifier (PCI). Based on the PCI, the UE can determine the locations of the aforementioned DMRS. The physical broadcast channel (PBCH), which carries a master information block (MIB), may be logically grouped with the PSS and SSS to form a synchronization signal (SS)/PBCH block. The MIB provides a number of RBs in the system bandwidth and a system frame number (SFN). The physical downlink shared channel (PDSCH) carries user data, broadcast system information not transmitted through the PBCH such as system information blocks (SIBs), and/or paging messages.

As illustrated in FIG. 4C, some of the REs carry DMRS (indicated as R for one particular configuration, but other DMRS configurations are possible) for channel estimation at the base station. The UE may transmit DMRS for the PUCCH and DMRS for the PUSCH. The PUSCH DMRS may be transmitted, for example, in the first one or two symbols of the PUSCH. The PUCCH DMRS may be transmitted in different configurations depending on whether short or long PUCCHs are transmitted and depending on the particular PUCCH format used. UE 104 may transmit sounding reference signals (SRS). The SRS may be transmitted, for example, in the last symbol of a subframe or slot. The SRS may have a comb structure, and a UE may transmit SRS on one of the combs. The SRS may be used by a base station for channel quality estimation to enable frequency-dependent scheduling on the UL.

FIG. 4D illustrates an example of various UL channels within a subframe of a frame. The PUCCH may be located as indicated in one configuration. The PUCCH carries uplink control information (UCI), such as scheduling requests, a channel quality indicator (CQI), a precoding matrix indicator (PMI), a rank indicator (RI), and HARQ ACK/NACK feedback. The PUSCH carries data, and may additionally be used to carry a buffer status report (BSR), a power headroom report (PHR), and/or UCI.

Introduction to Control Resource Sets (CORESETs) and Blind Decoding

A control resource set (CORESET) for an OFDMA system (e.g., a communications system transmitting PDCCH using OFDMA waveforms) may comprise one or more control resource (e.g., time and frequency resources) sets, configured for conveying PDCCH, within the system bandwidth (e.g., a specific area on the NR Downlink Resource Grid) and a set of parameters used to carry PDCCH/DCI. For example, a CORESET may by similar in area to an LTE PDCCH area (e.g., the first 1,2,3,4 OFDM symbols in a subframe).

Within each CORESET, one or more search spaces (e.g., common search space (CSS), user equipment (UE)-specific search space (USS), etc.) may be defined for a given UE. Search spaces are generally areas or portions in a downlink resource grid where a communication device (e.g., a UE) may look for control information.

A CORESET is a set of time and frequency domain resources, defined in units of resource element groups (REGs). Each REG may comprise a fixed number (e.g., twelve) tones/subcarriers in one symbol period (e.g., a symbol period of a slot), where one tone in one symbol period is referred to as a resource element (RE). A fixed number of REGs, such as six, may be included in a control channel element (CCE). Sets of CCEs may be used to transmit PDCCHs (PDCCHs), with different numbers of CCEs in the sets used to transmit PDCCHs using differing aggregation levels. Multiple sets of CCEs may be defined as search spaces for UEs and, thus, a network entity (e.g., BS 102) may transmit a PDCCH to a UE by transmitting the NR-PDCCH in a set of CCEs that is defined as a PDCCH decoding candidate within a search space for the UE. The UE may receive the PDCCH by performing blind decoding on decoding candidates within the search space to find and decode the PDCCH transmitted by the network entity. Additional details regarding blind decoding will be described in greater detail below.

As noted above, different aggregation levels may be used to transmit sets of CCEs. Aggregation levels may be generally defined as the number of CCEs that consist of a PDCCH candidate and may include aggregation levels 1, 2, 4, 8, and 16, which may be configured by a radio resource control (RRC) configuration of a search space set (SS-set). A CORESET may be linked with the SS-set within the RRC configuration. For each aggregation level, the number of PDCCH candidates may be RRC configurable.

Aspects Related to Blind Decoding Improvements

To receive certain data transmissions transmitted on a physical downlink shared channel (PDSCH) from a network entity (e.g., BS 102 of FIGS. 1 and 3 or a disaggregated BS as described with respect to FIG. 2), scheduling grants including scheduling information for the data transmissions may be transmitted to a UE (e.g., UE 104) in downlink control information (DCI) on a physical downlink control channel (PDCCH). In other words, DCI transmitted on a PDCCH may include scheduling information indicating time-frequency resources that the UE may use to receive data transmitted on a PDSCH.

Unlike data transmissions on the PDSCH, however, the exact time-frequency resources for transmitting control channel transmissions on the PDCCH may not be scheduled. Instead, when receiving a control channel transmission (e.g., DCI) transmitted on a PDDCH, a UE may use blind decoding to search for the location of control channel resources. Blind decoding involves searching for all possible combinations of control channel resources within a set of predefined frequency and time-domain resource blocks called CORESETs. Within each CORESET, there are several possible search spaces, each of which corresponds to a specific set of resource elements within the CORESET. To further optimize resource utilization, a UE may be configured to monitor for control channel transmissions on a PDCCH within certain monitoring occasions, which define the specific time-frequency resources and search spaces that a UE should use to monitor the control channel transmissions on the PDCCH. Each UE is configured with a set of monitoring occasions, which may be based on factors such as the UE's location, mobility, and traffic characteristics.

In order to receive a control channel transmission, the UE may first determine which CORESET and search space to use based on one or more configured monitoring occasions. The UE may then perform blind decoding on PDCCH decoding candidates within the CORESET and search space to search for and decode a control channel transmission. If the UE successfully decodes the control channel transmission, the UE may then use the scheduling information contained therein to determine the scheduling and configuration of data transmissions on the PDSCH.

In certain wireless communication standards, such as fifth generation (5G) new radio (NR) standards, configuration of PDCCH decoding candidates for receiving DCI (e.g., including downlink (DL) scheduling grants and uplink (UL) scheduling grants) transmitted within different DCI formats may be tied or linked to each other. For example, for UE-specific search space configurations, a higher layer parameter "dci-Formats" may configure a UE to monitor/blind decode PDCCH decoding candidates either for DCI format 0_0 (UL) and DCI format 1_0 (DL), or for DCI format 0_1 (UL) and DCI format 1_1 (DL). Similarly a higher layer parameter "dci-FormatsSL-r16" may configure a UE to monitor/blind decode PDCCH decoding candidates either for DCI format 3_0 (UL) and DCI format 3_1 (DL). Similarly for "dci-FormatsExt-r16" may configure a UE to monitor/blind decode PDCCH decoding candidates either for DCI format 0_2 (UL) and DCI format 1_2 (DL), for DCI format 0_1 (UL) and DCI format 1_1 (DL), or for DCI format 0_2 (UL) and DCI format 1_2 (DL)

In some cases, two different DCI formats may have a same control channel element (CCE) aggregation level, DCI size, and demodulation reference signal (DM-RS) scrambling sequence. In such cases, a size of DCI formats 0_0 and 1_0 may be the same. As a result, a single blind decode may be sufficient to check whether a format of a received DCI is a DL format or an UL format, for example, based on a one bit identifier in the DCI used to distinguish the UL-type formats from the DL-type formats. In some cases, however, if the UE is configured by "dci-Formats" to monitor/blind decode control channel candidates to receive DCI format 0_1 and DCI format 1_1, a single blind decode may not be sufficient for the UE to determine whether a PDCCH decoding candidate is for associated with an UL-type DCI format or a DL-type DCI format. For example, any DCI received by the UE may include a DCI format identifier field including one or more bits that indicate a type of DCI format of the received DCI. For example, the one or more bits in the DCI format identifier field may indicate whether the received DCI has an UL-type DCI format (e.g., DCI format 0_0, 0_1, etc.) or whether the received DCI has a DL-type DCI format (e.g., DCI format 1_0, 1_1, etc.). Accordingly, when blindly decoding a DCI, the UE may use the one or more bits in the DCI format identifier field to determine the type of format of the DCI.

In some cases, two different DCI formats may have different sizes. For example, the sizes of DCI formats 0_1 and 1_1 may be different depending on what type of information is carried within each DCI format. When the sizes of DCI formats 0_1 and 1_1 are different, PDCCH decoding candidates for each of these DCI formats may be treated separately as different PDCCH decoding candidates. As a result, the UE may have to perform separate blind decodes to receive these DCI formats, resulting in higher power consumption at the UE. For example, the UE may have to perform four blind decodes for DCI formats 0_1 (UL) and another four blind decodes for DCI formats 1_1 (DL) since these DCI formats have a different size.

In certain applications, such as extended reality (XR), UL and DL traffic rates may be asymmetric. In other words, UL traffic and DL traffic may occur at different times, resulting in some periods of time in which only UL traffic is expected to be communicated and other times in which only DL traffic is expected to be communicated. An example of this asymmetry is shown in FIG. 5.

Figure 5:
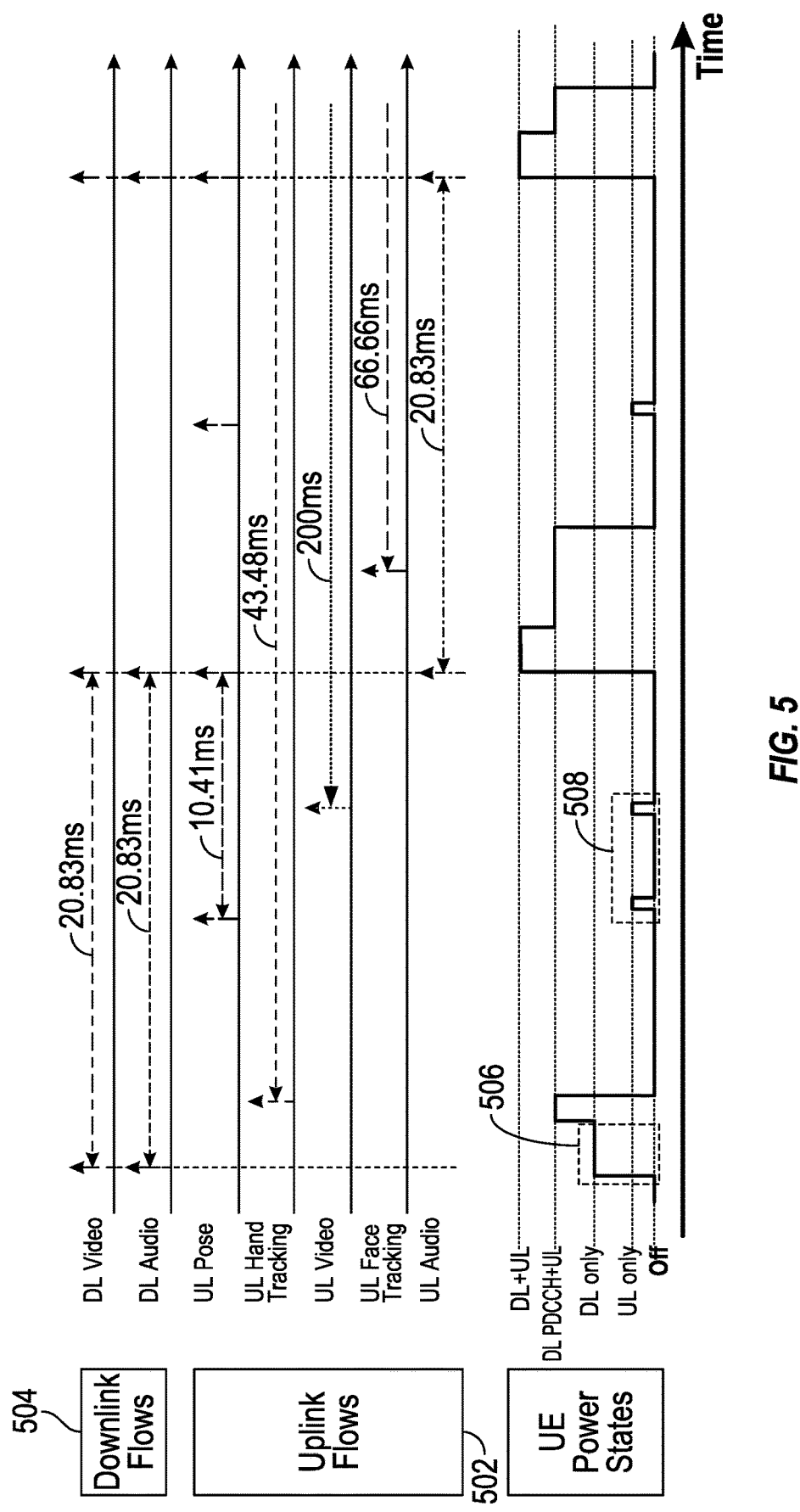
FIG. 5 illustrates different periodicities of uplink and downlink traffic of a user equipment for an extended reality use case.

FIG. 5 illustrates different periodicities of UL and DL traffic of a UE for an XR use case. For example, as shown, XR may have a plurality of UL traffic flows 502 and a plurality of DL traffic flows 504. The DL traffic flows 504 may include traffic flows for DL video and DL audio. Similarly, the UL traffic flows 502 include traffic flows for UL pose (e.g., posing information associated with a user), UL hand tracking, UL video, UL face tracking, and UL audio. As shown, each of these traffic flows may be communicated according to a particular frequency or periodicity, some of which are communicated more frequently and some of which are communicated less frequently.

For example, as can be seen, the traffic flows for DL video and DL audio may be communicated every 20.83 milliseconds while the traffic flow for UL pose may be communicated more frequently at every 10.41 milliseconds. Further, as shown, the traffic flows for UL hand tracking, UL video, and UL face tracking may be communicated less frequently at every 43.48 milliseconds, 200 milliseconds, and 66.66 milliseconds, respectively. Additionally, as shown, the traffic flow for UL audio may also be communicated every 20.83 milliseconds.

As shown, the UE may operate in different power states when communicating (e.g., receiving/transmitting) DL and UL traffic, such as a DL+UL power state, a DL PDCCH+UL power state, a DL only power state, and an UL only power state. Further, as shown, due to the different frequencies or periodicities of the traffic flows, there may be periods of time in which only DL traffic is expected to be communicated (e.g., received) by the UE and other periods of time in which only UL traffic is expected to be communicated (e.g., transmitted) by the UE. For example, as shown at time period 506, only DL traffic is expected to be communicated, while only UL traffic is expected to be communicated at time period 508.

In FIG. 5, the vertical arrows associated with each traffic flow demonstrates when transmissions (e.g., packets) for each of these traffic flows is scheduled to be communicated (e.g., transmitted or received). As discussed above, each of these transmissions may be scheduled based on scheduling information transmitted in DCIs on a PDCCH (not shown in FIG. 5). As a result, the UE will need to perform blind decoding on a plurality of PDCCH decoding candidates to receive the scheduling information transmitted within the DCIs. For example, the UE may need to perform a number a blind decodes to receive UL-type DCIs that schedule transmissions for the UL traffic flows in FIG. 5 and may also need to perform a number of blind decodes to receive DL-type DCIs that schedule transmissions for the DL traffic flows in FIG. 5.

However, because UL traffic and DL traffic may be communicated asymmetrically resulting in periods of UL-only traffic and DL-only traffic, forcing the UE to perform an equal amount of blind decodes on PDCCH decoding candidates for receiving UL-type DCIs and DL-type DCIs may periodically result in the UE having to perform unnecessary blind decodes, resulting in wasted power resources at the UE and reducing opportunities to put the UE in a "sleep" mode to save power.

For example, discussed above, only DL traffic is expected to be communicated (e.g., received) by the UE in the time period 506 of FIG. 5. However, even though the UE may not have any UL traffic to communicate (e.g., transmit) within the time period 506, the UE may, in some cases, still be configured to monitor a same number of PDCCH candidates to receive UL-type DCI for this (non-existent) UL traffic as for receiving DL-type DCI for the DL traffic within the time period 506. Similarly, even though the UE may not have any DL traffic to communicate (e.g., receive) within the time period 508, the UE may, in some cases, still be configured to monitor a same number of PDCCH candidates to receive DL-type DCI for this (non-existent) DL traffic as for receiving UL-type DCI for the UL traffic within the time period 508.

Accordingly, aspects of the present disclosure provide techniques for improving blind decoding when receiving control information from a network entity. For example, in some cases, these techniques may involve reducing or eliminating performing blind decodes to receive DCI for certain link directions when only traffic associated with another link direction is expected to be communicated within a particular time period.

More specifically, for example, in some cases a UE may obtain an indication that only traffic associated with a first link direction (e.g., DL traffic or UL traffic) is expected to be communicated within a particular time period. Based on this indication, the UE may perform blind decoding during the particular time period to receive DCI for the first link direction but may reduce or eliminate a number of blind decodes associated with receiving DCI for a second link direction (e.g., UL traffic or DL traffic).

For example, if only UL traffic is expected to be communicated during the particular time period (e.g., time period 508), then the UE may reduce or eliminate performing blind decodes to receive DCI for DL traffic since no DL traffic is expected to be communicated within the particular time period and, as such, no DCIs that scheduled the DL traffic are expected to be received. In other words, the UE may reduce or eliminate a number of PDCCH decoding candidates that it has to blindly decode for DCI for DL traffic since only UL traffic is expected to be communicated during the particular period of time. In some cases, power consumption at the UE may be reduced by reducing or eliminating performing blind decodes for DCI for certain link directions that are not expected to be communicated within the particular time period. Additionally, because the UE has reduced or eliminated certain blind decodes, there are more opportunities to place the UE in a "sleep" mode, thereby further reducing power consumption at the UE.

Additionally, when only traffic associated with the first link direction is expected to be communicated within the particular time period, the UE may be able to implicitly determine that a received DCI may have a particular type of DCI format associated with the first link direction. As a result, the one or more bits in the DCI format identifier field included within the received DCI may be redundant and not necessary. Instead, in such scenarios, the one or more bits in the DCI format identifier field within the DCI may be repurposed and used to carry information associated with one or more other fields of the DCI. Repurposing the one or more bits in the DCI format identifier field to carry information for one or more other fields in the DCI may be beneficial because the network entity (e.g., BS 102/gNB) may, for example, indicate more code points for any of the fields that use the one or more bits of the DCI format identifier field.

Example Operations of Entities in a Communications Network

FIG. 6 depicts a process flow including operations 600 for communications in a network between a network entity 602 and a UE 604. In some cases, the operations 600 may improve blind decoding performed by the UE 604 in scenarios in which only traffic of a certain link direction is expected to be communicated. In some aspects, the network entity 602 may be an example of the BS 102 depicted and described with respect to FIGS. 1 and 3 or a disaggregated base station depicted and described with respect to FIG. 2. Similarly, the UE 604 may be an example of UE 104 depicted and described with respect to FIGS. 1 and 3. However, in other aspects, UE 104 may be another type of wireless communications device and BS 102 may be another type of network entity or network node, such as those described herein.

As shown, operations 600 begin in step 610 with the UE 604 obtaining control configuration information for receiving DCI for at least a first link direction and a second link direction. In some cases, as shown, the control configuration information may be obtained from the network entity 602. In other cases, the control configuration information may be pre-configured and stored in memory of the UE 604, for example, by a manufacturer or retailer of the UE 604. In some cases, the first link direction may comprise an uplink direction and the second link direction comprises a downlink direction. In other cases, the first link direction may comprise downlink direction and the second link direction comprises an uplink direction.

In some cases, the control configuration information may comprise an indication of one or more CORESETs for receiving the DCI. In some cases, the control configuration information may comprise an indication of one or more search space sets for receiving the DCI. In some cases, the control configuration information may comprise an indication of one or more monitoring occasions for receiving the DCI.

In some cases, the control configuration information may comprise an indication of a total number of blind decodes for receiving the DCI. In some cases, of the total number of blind decodes, the UE 604 may be configured with a first number of blind decodes to perform (e.g., on the first number of PDCCH decoding candidates) to search for and receive the DCI for the first link direction. Additionally, in some cases, the UE 604 may also be configured with a second number of blind decodes to perform (e.g., on the second number of PDCCH decoding candidates) to search for and receive the DCI for the second link direction.

Thereafter, as shown in step 612, the UE 604 obtains an indication that only traffic of the first link direction is expected to be communicated (e.g., received by UE 604 if downlink or transmitted by UE 604 if uplink) in a first period of time. In some cases, as shown at 614, the UE 604 may obtain the indication that only the traffic of the first link direction is expected to be communicated in the first period of time from the network entity 602.

In other cases, the UE 604 may obtain the indication by determining that only the traffic of the first link direction is expected to be communicated in the first period of time. For example, in some cases, the UE 604 may determine that only the traffic of the first link direction is expected to be communicated in the first period of time based on a type of communication that is to be communicated. For example, in the case of XR communication, UL traffic and DL traffic may occur at different frequencies or periodicities. Accordingly, based on the type of traffic being XR (or some other type of traffic with different frequencies or periodicities), the UE 604 may know when to expect to communicate UL traffic and when to expect to communicate DL traffic. For example, based on the different frequencies or periodicities of the UL and DL traffic flows in XR communication, the UE 604 may determine that only UL traffic is expected to be communicated in certain time periods (e.g., time period 508 in FIG. 5) while only DL traffic is expected to be communicated in other time periods (e.g., time period 506 in FIG. 5).

In some cases, the UE 604 may determine that only the traffic of the first link direction is expected to be communicated in the first period of time based on known periodic traffic arrival times associated with the traffic of the first link direction and traffic of the second link direction. In some cases, the UE 604 may determine that only the traffic of the first link direction is expected to be communicated in the first period of time based on an end of bust indication associated with the traffic of the first link direction or traffic of the second link direction. In some cases, the UE 604 may determine that only the traffic of the first link direction is expected to be communicated in the first period of time based on a PDCCH skipping indication associated with traffic of the first link direction or traffic of the second link direction. In some cases, the UE 604 may determine that only the traffic of the first link direction is expected to be communicated in the first period of time based on a discontinuous reception (DRX) media access control-control element (MAC-CE) associated with traffic of the first link direction or traffic of the second link direction.

In some cases, the UE 604 may determine that only the traffic of the first link direction is expected to be communicated in the first period of time based on a packet delay budget (PDB) associated with the traffic of the first link direction or traffic of the second link direction. For example, in some cases, if the UE 604 is being heavily scheduled to communicate traffic of the first link direction to meet a certain PDB associated with the traffic of the first link direction, then during that period the UE can expect more DCIs scheduling the traffic of the first link direction.

In some cases, the UE 604 may determine that only the traffic of the first link direction is expected to be communicated in the first period of time based on retransmission timers associated traffic of the first link direction or traffic of the second link direction (e.g., DL traffic or UL traffic). For example, in some cases, the UE 604 may transmit a negative acknowledgement (NACK) for a corresponding PDSCH transmitted by the network entity 602. In this case, after transmitting the NACK, the UE 604 may then start or restart a DL discontinuous reception (DRX) hybrid automatic repeat request (HARQ) round trip time (RTT) timer (e.g., drx-HARQ-RTT-TimerDL). After the DL DRX HARQ RTT timer expires, the UE 604 may start a DL DRX retransmission timer (e.g., drx-Retransmission TimerDL). During the period of time of the DL DRX retransmission timer, the UE 604 may only expect to communicate (e.g., receive) DL traffic and, as such, may only need to monitor/blind decode for DL-type DCIs and may not need to monitor/blind decode for UL-type DCIs.

A similar example may occur in the UL where the UE 604 transmits a PUSCH. After transmitting the PUSCH, the UE 604 may start or restart an UL DRX HARQ RTT timer (e.g., drx-HARQ-RTT-TimerUL). After the UL DRX HARQ RTT timer expires, the UE 604 may then start an UL DRX retransmission timer. In the period of UL DRX retransmission timer, the UE 604 may only expect to communicate (e.g., transmit) UL traffic and, as such, may only need to monitor/blind decode for UL-type DCIs and may not need to monitor/blind decode for DL-type DCIs.

As shown in step 616, the UE 604 may perform, based on the control configuration information obtained in step 610 and the indication that only the traffic of the first link direction is expected to be communicated in the first period of time obtained in step 612, a first number of blind decodes, of a total number of blind decodes, during the first period of time to receive the DCI for the first link direction. In some cases, performing the first number of blind decodes may comprise performing blind decodes on a same number of PDCCH decoding candidates, defined within one or more CORESETs and one or more search spaces, to search for and receive the DCI for the first link direction. For example, as shown, in step 618, the UE 604 may receive the DCI for the first link direction based on the first number of blind decodes that are performed by the UE 604 in step 616.

In one example, the UE 604 may be configured with a UE-specific Search Space (USS) with tied or linked DCI formats, as explained above, or with a Type 3 Common Search Space (CSS). In other cases the UE may be configured with new type of search space set with separate DL-type DCI and UL-type DCI not tied or linked together, allowing the UE to search within the search space set for only DL-type DCI or only UL-type DCI. For example, a search space set with DL-type DCIs may be prioritized by the UE 604 in step 616 during DL-only traffic. Similarly, a search space set with UL-type DCIs may be prioritized by the UE 604 in step 616 during UL-only traffic.

The same concept may also extend to Search Space Set Group (SSSGs) where a group can be configured with multiple search space sets. For example, the UE 604 may be configured with new type of search space set with separate DL-type DCI and UL-type DCI not tied or linked together, allowing the UE 604 to prioritize monitoring/blind decoding SSSG for DL only or UL only. For example, the UE 604 may prioritize SSSG with DL-type DCIs in step 616 during DL only traffic and may prioritize SSSG with UL-type DCIs in step 616 during UL only traffic.

Further, as shown in step 620, because only traffic of the first link direction is expected to be communicated during the first time period, the UE 604 may refrain from performing the second number of blind decodes associated with receiving the DCI for the second link direction. In some cases, the UE 604 may receive additional configuration information from the network entity 602 indicating to refrain from performing the second number of blind decodes during the first period of time when the UE obtains the indication that only the traffic of the first link direction is expected to be communicated in the first period of time.

In some cases, refraining from performing the second number of blind decodes may include performing zero blind decodes for receiving the DCI for the second link direction. In other cases, refraining from performing the second number of blind decodes may include performing a reduced number of blind decodes, relative to the second number of blind decodes, for receiving the DCI for the second link direction.

As an example, assume that the UE 604 obtains an indication that only UL traffic is expected to be communicated (e.g., transmitted by the UE 604) during the first period of time (e.g., time period 508 in FIG. 5). In this case, the UE 604 may still perform the first number of blind decodes for receiving the DCI for the UL direction (e.g., DCI formats 0_0, 0_1, etc.). However, to conserve power, the UE 604 may reduce the number of blind decodes that it performs for receiving DCI for a DL direction (e.g., DCI formats 1_0, 1_1, etc.) since no DL traffic is expected to be communicated (e.g., received by the UE 604) during the first period of time. Alternatively, to conserve power, the UE 604 may completely refrain from performing any blind decodes for receiving DCI for the DL direction since no DL traffic is expected to be communicated (e.g., received by the UE 604) during the first period of time.

As another example, assume that the UE 604 obtains an indication that only DL traffic is expected to be communicated (e.g., received by the UE 604) during the first period of time (e.g., time period 506 in FIG. 5). In this case, the UE 604 may still perform the first number of blind decodes for receiving the DCI for the DL direction (e.g., DCI formats 1_0, 1_1, etc.). However, to conserve power, the UE 604 may reduce the number of blind decodes that it performs for receiving DCI for an UL direction (e.g., DCI formats 0_0, 0_1, etc.) since no UL traffic is expected to be communicated (e.g., transmitted by the UE 604) during the first period of time. Alternatively, to conserve power, the UE 604 may completely refrain from performing any blind decodes for receiving DCI for the UL direction since no UL traffic is expected to be communicated (e.g., transmitted by the UE 604) during the first period of time.

Table 1, below, illustrates one example of a number of blind decodes that the UE 604 may perform using the techniques presented herein when only UL traffic is expected to be communicated within the first time period as compared to legacy blind decoding techniques (e.g., Third Generation Partnership Project (3GPP) Release 15) for different CCE aggregation levels.

TABLE 1

| | Release 15 | With blind decoding enhancements | |
| | | | |
| CCE aggregation level | Number of blind decodes/PDCCH decoding candidates | Number of DL blind decodes/PDCCH decoding candidates | Number of UL blind decodes/PDCCH decoding candidates |
| --- | --- | --- | --- |
| 4 | 8 (4 DL + 4 UL) | 0 | 4 |
| 8 | 4 (2 DL + 2 UL) | 0 | 2 |
| 16 | 2 (1 DL + 1 UL) | 0 | 1 |
| Total (DL + UL) | 14 | 7 | |

As can be seen in Table 1, for a CCE aggregation level of 4, the UE 604 under legacy techniques (e.g., Release 15) is expected to perform a total of 8 blind decodes, including 4 blind decodes for receiving DCI for a DL direction and 4 blind decodes for receiving DCI for a UL direction, even in an UL-only traffic scenario (e.g., when only UL traffic is expected to be communicated within the first time period). In comparison, when using the blind decoding enhancements described herein for the CCE aggregation level of 4, the UE 604 may only be expected to perform 4 blind decodes for receiving the DCI for the UL directions while not being expected to perform any blind decodes for receiving DCI for the DL direction.

Table 2, below, illustrates one example of a number of blind decodes that the UE 604 may perform using the techniques presented herein when only DL traffic is expected to be communicated within the first time period as compared to legacy blind decoding techniques (e.g., 3GPP Release 15) for different CCE aggregation levels.

TABLE 2

| | Release 15 | With blind decoding enhancements | |
| | | | |
| CCE aggregation level | Number of blind decodes/PDCCH decoding candidates | Number of DL blind decodes/PDCCH decoding candidates | Number of UL blind decodes/PDCCH decoding candidates |
| --- | --- | --- | --- |
| 4 | 8 (4 DL + 4 UL) | 4 | 0 |
| 8 | 4 (2 DL + 2 UL) | 2 | 0 |
| 16 | 2 (1 DL + 1 UL) | 1 | 0 |
| Total (DL + UL) | 14 | 7 | |

As can be seen in Table 2, for a CCE aggregation level of 4, the UE 604 under legacy techniques (e.g., Release 15) is expected to perform a total of 8 blind decodes, including 4 blind decodes for receiving DCI for a DL direction and 4 blind decodes for receiving DCI for a UL direction, even in a DL-only traffic scenario (e.g., when only DL traffic is expected to be communicated within the first time period). In comparison, when using the blind decoding enhancements described herein for the CCE aggregation level of 4, the UE 604 may only be expected to perform 4 blind decodes for receiving the DCI for the DL directions while not being expected to perform any blind decodes for receiving DCI for the UL direction.

As noted above, in step 618, the UE 604 may receive DCI for the first link direction based on the first number of blind decodes performed by the UE 604 in step 616. In some cases, the DCI for the first link direction may include a scheduling grant with scheduling information scheduling time-frequency resources for communicating traffic of the first link direction. As shown in step 622, the UE 604 may use the scheduled time-frequency resources within the DCI to communicate the traffic of the first link direction with the network entity 602. For example, when the first link direction comprises a DL direction, communicating the traffic of the first link direction in step 622 may include receiving one or more DL transmissions from the network entity 602. Alternatively, when the first link direction comprises an UL direction, communicating the traffic of the first link direction in step 622 may include transmitting one or more UL transmissions to the network entity 602.

As noted above, in some cases, DCI transmitted by the network entity 602 may include a DCI format identifier field including one or more bits. The one or more bits in the DCI format identifier field may be used to indicate a type of format of the DCI. For example, the one or more bits in the DCI format identifier field may indicate whether the type of format of the DCI is an UL-type format and the DCI is for scheduling traffic for a UL direction or whether the type of format of the DCI is a DL-type format and the DCI is for scheduling traffic for a DL direction.

In some case, when only traffic of the first link direction is expected to be communicated within the first time period, then the UE 604 may only expect to receive DCI for the first link direction and may not expect to receive DCI for the second link direction. As a result, the one or more bits in the DCI format identifier field may be unnecessary since the UE 604 may inherently determine the type of format of the DCI received for the first link direction based on the indication that only traffic of the first link direction is expected to be communicated within the first time period.

Accordingly, in some cases, the one or more bits included in a DCI format identifier field may instead be repurposed. For example, based on only the traffic of the first link direction being expected to be communicated in the first period of time, the one or more bits included in the DCI format identifier field of the DCI for the first link direction may carry information for one or more other fields of the DCI for the first link direction.

In some cases, the one or more fields that may make use of these repurposed one or more bits of the DCI format identifier field may be radio resource control (RRC) configured fields such, such as a time domain resource allocation (TDRA) field or a frequency domain resource allocation (FDRA) field. Accordingly, in some cases, the DCI for the first link direction may support a configurable number of bits for the one or more other fields. As an example, a legacy TDRA field may include X number of legacy bits. However, when only traffic of the first link direction is expected to be communicated within the first period of time, the TDRA field may be configured to include the X number of legacy bits as well as the one or more bits of the DCI format identifier field. Similarly, a legacy FDRA field may include Y number of legacy bits. However, when only traffic of the first link direction is expected to be communicated within the first period of time, the FDRA field may be configured to include the Y number of legacy bits as well as the one or more bits of the DCI format identifier field.

In some cases, due to the one or more bits of the DCI format identifier field being able to be repurposed, there is some probability that repurposing these bits could lead to misalignment between the network entity 602 and the UE 604. For example, in some cases, the UE 604 may believe that the one or more bits of the DCI format identifier field have been repurposed when in actuality the network entity 602 have not repurposed these bits. In such cases, the UE 604 may incorrectly interpret the information of the one or more other fields that it believes have been expanded using the one or more bits of the DCI format identifier field. This may lead to the UE 604 incorrectly communicating traffic of the first link direction scheduled by the DCI for the first link direction.

To help address these potential issues, certain constraints may be applied to the repurposing of the one or more bits in the DCI format identifier field. For example, in some cases, the one or more bits in the DCI format identifier field may be repurposed to carry information for the one or more other fields when the DCI is protected by hybrid automatic repeat request acknowledgement (HARQ-ACK), such as when the DCI comprises non-scheduling DCI with HARQ-ACK, a scheduling DCI, or a media access control-control element (MAC-CE).

Accordingly, for example, in some cases, the UE 604 may be configured to transmit feedback information for the DCI for the first link direction. In such cases, based on the UE 604 being configured to transmit the feedback information for the DCI for the first link direction, the one or more bits included in the DCI format identifier field of the DCI for the first link direction carry the information for one or more other fields.

In some cases, the one or more bits in the DCI format identifier field may be repurposed to carry information for the one or more other fields when the repurposed one or more bits of the DCI format indicator field are repurposed. For example, the one or more bits included in the DCI format identifier field may be configured to carry information related to transmit power control.

In some cases, the one or more bits in the DCI format identifier field may be repurposed to carry information for the one or more other fields when the network entity 602 indicates to the UE 604 that only the traffic of the first link direction is expected to be communicated during the first time period. For example, in some cases, in step 614 discussed above, the UE 604 may receive the indication indicating that only the traffic of the first link direction is to be expected to be communicated in the first period of time. In such cases, the one or more bits included in the DCI format identifier field of the DCI for the first link direction may carry the information for one or more other fields further based on the indication indicating that only the traffic of the first link direction is to be expected to be communicated in the first period of time transmitted from the network entity 602 to the UE 604.

In some cases, the one or more bits in the DCI format identifier field may be repurposed to carry information for the one or more other fields when blind decoding is distinguished or separated between all DCI formats, such as DCI format 0_0 and DCI format 1_0, which currently have shared blind decodes. For example, the one or more bits included in the DCI format identifier field of the DCI for the first link direction may be configured to carry the information for one or more other fields further based on the first number of blind decodes being assigned to the DCI for the first link direction and the second number of blind decodes being assigned to the DCI for the second link direction. In other words, the one or more bits in the DCI format identifier field may be repurposed to carry information for the one or more other fields when DCI for the first link direction and second link direction are assigned separate numbers of blind decodes.

In some cases, the control configuration information received by the UE 604 in step 610 may include an indication of a timer value to use when performing the blind decoding enhancements described above. For example, when the UE 604 obtains the indication that only the traffic of the first link direction is expected to be communicated in the first period of time, the UE 604 may start a timer with the configured timer value at the beginning of the first period of time. The UE 604 may then begin operating according to the bind decoding enhancements described above. For example, while the timer is running, the UE 604 may refrain from performing the second number of blind decodes associated with receiving the DCI for the second link direction while still performing the first number of blind decodes to receive the DCI for the first link direction. Additionally, while the timer is running, the UE 604 may interpret the one or more bits in the DCI format identifier field to carry information for the one or more other fields of the DCI for the first link direction.

When the timer expires, the UE 604 may revert to legacy operation. For example, when the timer expires, the UE 604 may begin performing, based on the control configuration information, the first number of blind decodes to receive the DCI for the first link direction for the first link direction during a second period of time that does not overlap with the first period of time. Additionally, after expiration of the timer, the UE 604 may begin performing, based on the control configuration information, the second number of blind decodes to receive the DCI for the second link direction for the second link direction during the second period of time.

Example Operations of a User Equipment

FIG. 7 shows an example of a method 700 of wireless communication by a user equipment (UE), such as a UE 104 of FIGS. 1 and 3.

Method 700 begins at step 705 with obtaining control configuration information for receiving downlink control information (DCI) for at least a first link direction and a second link direction. In some cases, the operations of this step refer to, or may be performed by, circuitry for obtaining and/or code for obtaining as described with reference to FIG. 9.

Method 700 then proceeds to step 710 with obtaining an indication that only traffic of the first link direction is expected to be communicated in a first period of time. In some cases, the operations of this step refer to, or may be performed by, circuitry for obtaining and/or code for obtaining as described with reference to FIG. 9.

Method 700 then proceeds to step 715 with performing, based on the control configuration information and the indication, a first number of blind decodes, of a total number of blind decodes, during the first period of time to receive the DCI for the first link direction. In some cases, the operations of this step refer to, or may be performed by, circuitry for performing and/or code for performing as described with reference to FIG. 9.

Method 700 then proceeds to step 720 with refraining, during the first time period, from performing a second number of blind decodes, of the total number of blind decodes, associated with receiving the DCI for the second link direction based on the indication that only the traffic of the first link direction is expected to be communicated in the first period of time. In some cases, the operations of this step refer to, or may be performed by, circuitry for refraining and/or code for refraining as described with reference to FIG. 9.

In some aspects, the control configuration information comprises: an indication of one or more control resource sets (CORESETs) for receiving the DCI; an indication of one or more search space sets (SSSs) for receiving the DCI; an indication of one or more monitoring occasions for receiving the DCI; and the total number of blind decodes for receiving the DCI.

In some aspects, the method 700 further includes communicating the traffic of the first link direction using scheduled time-frequency resources indicated in the DCI for the first link direction. In some cases, the operations of this step refer to, or may be performed by, circuitry for communicating and/or code for communicating as described with reference to FIG. 9.

In some aspects, refraining from performing the second number of blind decodes comprises one of: performing zero blind decodes for receiving the DCI for the second link direction; or performing a reduced number of blind decodes, relative to the second number of blind decodes, for receiving the DCI for the second link direction.

In some aspects, the method 700 further includes receiving additional configuration information from a network entity indicating to refrain from performing the second number of blind decodes during the first period of time when the UE obtains the indication that only the traffic of the first link direction is expected to be communicated in the first period of time. In some cases, the operations of this step refer to, or may be performed by, circuitry for receiving and/or code for receiving as described with reference to FIG. 9.

In some aspects, the method 700 further includes receiving the DCI for the first link direction based on the performing the first number of blind decodes, wherein, based on only the traffic of the first link direction being expected to be communicated in the first period of time, one or more bits included in a DCI format identifier field of the DCI for the first link direction carry information for one or more other fields of the DCI for the first link direction. In some cases, the operations of this step refer to, or may be performed by, circuitry for receiving and/or code for receiving as described with reference to FIG. 9.

In some aspects, the one or more other fields comprise at least one of: a time domain resource allocation (TDRA) field; or a frequency domain resource allocation (FDRA) field.

In some aspects, the one or more bits included in the DCI format identifier field carry information related to transmit power control.

In some aspects, the UE is configured to transmit feedback information for the DCI for the first link direction, and based on the UE being configured to transmit the feedback information for the DCI for the first link direction, the one or more bits included in the DCI format identifier field of the DCI for the first link direction carry the information for one or more other fields.

In some aspects, the method 700 further includes receiving the indication indicating that only the traffic of the first link direction is to be expected to be communicated in the first period of time. In some cases, the operations of this step refer to, or may be performed by, circuitry for receiving and/or code for receiving as described with reference to FIG. 9.

In some aspects, the one or more bits included in the DCI format identifier field of the DCI for the first link direction carry the information for one or more other fields further based on the indication indicating that only the traffic of the first link direction is to be expected to be communicated in the first period of time.

In some aspects, the one or more bits included in the DCI format identifier field of the DCI for the first link direction carry the information for one or more other fields further based on the first number of blind decodes being assigned to the DCI for the first link direction and the second number of blind decodes being assigned to the DCI for the second link direction.

In some aspects, the method 700 further includes performing, based on the control configuration information, the first number of blind decodes to receive the DCI for the first link direction for the first link direction during a second period of time that does not overlap with the first period of time. In some cases, the operations of this step refer to, or may be performed by, circuitry for performing and/or code for performing as described with reference to FIG. 9.

In some aspects, the method 700 further includes performing, based on the control configuration information, the second number of blind decodes to receive the DCI for the second link direction for the second link direction during the second period of time. In some cases, the operations of this step refer to, or may be performed by, circuitry for performing and/or code for performing as described with reference to FIG. 9.

In some aspects, one of: the first link direction comprises a downlink direction and the second link direction comprises an uplink direction, or the first link direction comprises an uplink direction and the second link direction comprises a downlink direction.

Figure 9:
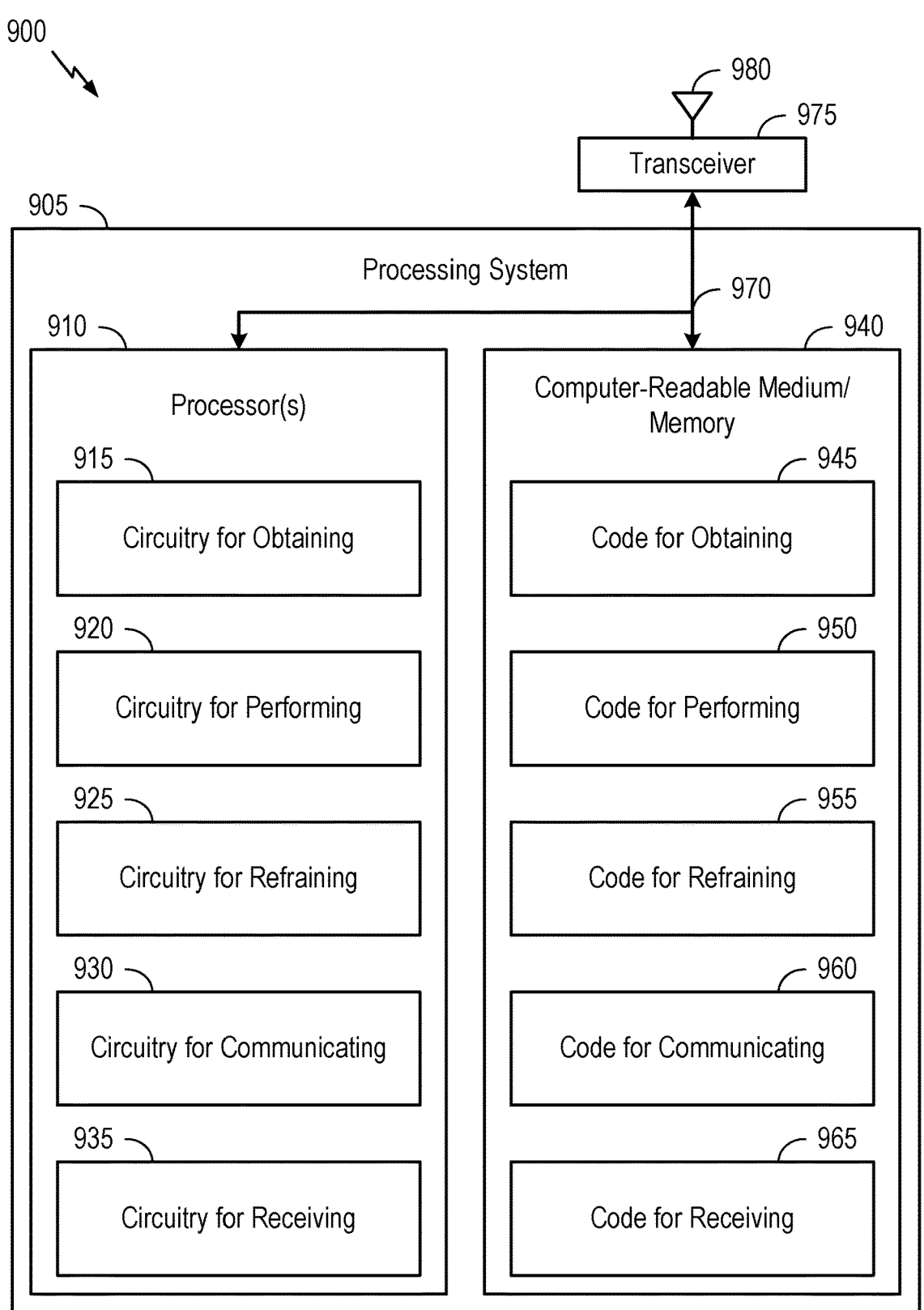
FIG. 9 depicts aspects of an example communications device.

In one aspect, method 700, or any aspect related to it, may be performed by an apparatus, such as communications device 900 of FIG. 9, which includes various components operable, configured, or adapted to perform the method 700. Communications device 900 is described below in further detail.

Note that FIG. 7 is just one example of a method, and other methods including fewer, additional, or alternative steps are possible consistent with this disclosure.

FIG. 8 shows an example of a method 800 of wireless communication by a network entity, such as a BS 102 of FIGS. 1 and 3, or a disaggregated base station as discussed with respect to FIG. 2.

Method 800 begins at step 805 with transmitting, to a user equipment (UE), control configuration information for receiving downlink control information (DCI) for at least a first link direction and a second link direction. In some cases, the operations of this step refer to, or may be performed by, circuitry for transmitting and/or code for transmitting as described with reference to FIG. 10.

Method 800 then proceeds to step 810 with obtaining an indication that only traffic of the first link direction is expected to be communicated in a first period of time. In some cases, the operations of this step refer to, or may be performed by, circuitry for obtaining and/or code for obtaining as described with reference to FIG. 10.

Method 800 then proceeds to step 815 with transmitting DCI for the first link direction, wherein, based on the indication that only the traffic of the first link direction is expected to be communicated in the first period of time, the DCI for the first link direction comprises a DCI format identifier field that includes one or more bits carrying information for one or more other fields of the DCI for the first link direction. In some cases, the operations of this step refer to, or may be performed by, circuitry for transmitting and/or code for transmitting as described with reference to FIG. 10.

In some aspects, the control configuration information comprises: an indication of one or more control resource sets (CORESETs) for receiving the DCI; an indication of one or more search space sets (SSSs) for receiving the DCI; an indication of one or more monitoring occasions for receiving the DCI; and the total number of blind decodes for receiving the DCI.

In some aspects, the one or more other fields comprise at least one of: a time domain resource allocation (TDRA) field; or a frequency domain resource allocation (FDRA) field.

In some aspects, the one or more bits included in the DCI format identifier field carry information related to transmit power control.

In some aspects, the network entity is configured to receive feedback information for the DCI for the first link direction; and based on the network entity being configured to receive the feedback information for the DCI for the first link direction, the one or more bits included in the DCI format identifier field of the DCI for the first link direction carry the information for one or more other fields.

In some aspects, the method 800 further includes transmitting, to the UE, the indication that only the traffic of the first link direction is to be expected to be communicated in the first period of time. In some cases, the operations of this step refer to, or may be performed by, circuitry for transmitting and/or code for transmitting as described with reference to FIG. 10.

In some aspects, the one or more bits included in the DCI format identifier field of the DCI for the first link direction carry the information for one or more other fields further based on the indication indicating that only the traffic of the first link direction is to be expected to be communicated in the first period of time.

In some aspects, the one or more bits included in the DCI format identifier field of the DCI for the first link direction carry the information for one or more other fields further based on the first number of blind decodes being assigned to scheduling grants for the first link direction and the second number of blind decodes being assigned scheduling grants for the second link direction.

In some aspects, one of: the first link direction comprises a downlink direction and the second link direction comprises an uplink direction, or the first link direction comprises an uplink direction and the second link direction comprises a downlink direction.

Figure 10:
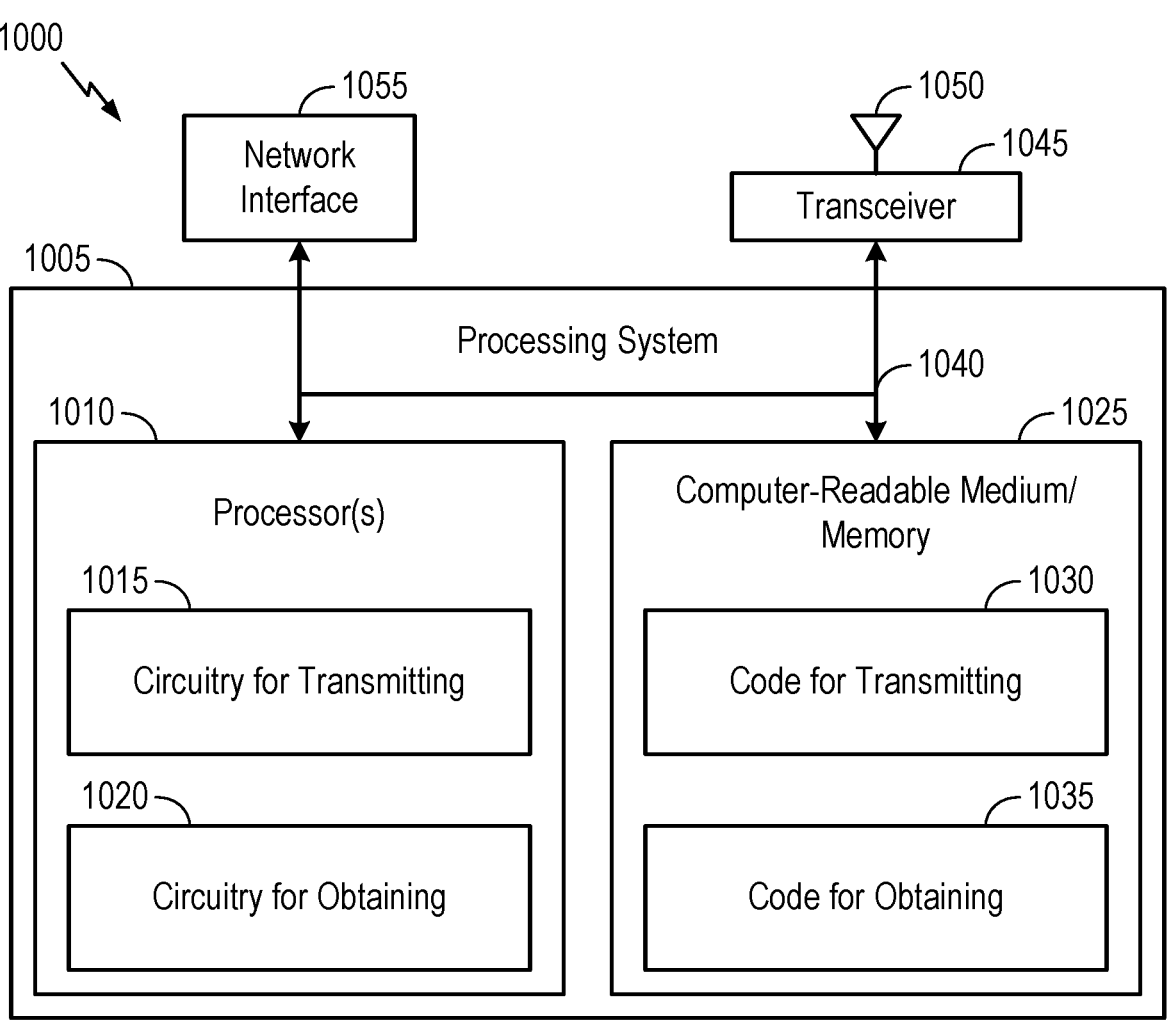
FIG. 10 depicts aspects of an example communications device.

In one aspect, method 800, or any aspect related to it, may be performed by an apparatus, such as communications device 1000 of FIG. 10, which includes various components operable, configured, or adapted to perform the method 800. Communications device 1000 is described below in further detail.

Note that FIG. 8 is just one example of a method, and other methods including fewer, additional, or alternative steps are possible consistent with this disclosure.

Example Communications Devices

FIG. 9 depicts aspects of an example communications device 900. In some aspects, communications device 900 is a user equipment, such as UE 104 described above with respect to FIGS. 1 and 3.

The communications device 900 includes a processing system 905 coupled to the transceiver 975 (e.g., a transmitter and/or a receiver). The transceiver 975 is configured to transmit and receive signals for the communications device 900 via the antenna 980, such as the various signals as described herein. The processing system 905 may be configured to perform processing functions for the communications device 900, including processing signals received and/or to be transmitted by the communications device 900.

The processing system 905 includes one or more processors 910. In various aspects, the one or more processors 910 may be representative of one or more of receive processor 358, transmit processor 364, TX MIMO processor 366, and/or controller/processor 380, as described with respect to FIG. 3. The one or more processors 910 are coupled to a computer-readable medium/memory 940 via a bus 970. In certain aspects, the computer-readable medium/memory 940 is configured to store instructions (e.g., computer-executable code) that when executed by the one or more processors 910, cause the one or more processors 910 to perform the method 700 described with respect to FIG. 7, or any aspect related to it. Note that reference to a processor performing a function of communications device 900 may include one or more processors 910 performing that function of communications device 900.

In the depicted example, computer-readable medium/memory 940 stores code (e.g., executable instructions), such as code for obtaining 945, code for performing 950, code for refraining 955, code for communicating 960, and code for receiving 965. Processing of the code for obtaining 945, code for performing 950, code for refraining 955, code for communicating 960, and code for receiving 965 may cause the communications device 900 to perform the method 700 described with respect to FIG. 7, or any aspect related to it.

The one or more processors 910 include circuitry configured to implement (e.g., execute) the code stored in the computer-readable medium/memory 940, including circuitry such as circuitry for obtaining 915, circuitry for performing 920, circuitry for refraining 925, circuitry for communicating 930, and circuitry for receiving 935. Processing with circuitry for obtaining 915, circuitry for performing 920, circuitry for refraining 925, circuitry for communicating 930, and circuitry for receiving 935 may cause the communications device 900 to perform the method 700 described with respect to FIG. 7, or any aspect related to it.

Various components of the communications device 900 may provide means for performing the method 700 described with respect to FIG. 7, or any aspect related to it. For example, means for transmitting, sending or outputting for transmission may include transceivers 354 and/or antenna(s) 352 of the UE 104 illustrated in FIG. 3 and/or the transceiver 975 and the antenna 980 of the communications device 900 in FIG. 9. Means for receiving or obtaining may include transceivers 354 and/or antenna(s) 352 of the UE 104 illustrated in FIG. 3 and/or the transceiver 975 and the antenna 980 of the communications device 900 in FIG. 9.

FIG. 10 depicts aspects of an example communications device 1000. In some aspects, communications device 1000 is a network entity, such as BS 102 of FIGS. 1 and 3, or a disaggregated base station as discussed with respect to FIG. 2.

The communications device 1000 includes a processing system 1005 coupled to the transceiver 1045 (e.g., a transmitter and/or a receiver) and/or a network interface 1055. The transceiver 1045 is configured to transmit and receive signals for the communications device 1000 via the antenna 1050, such as the various signals as described herein. The network interface 1055 is configured to obtain and send signals for the communications device 1000 via communication link(s), such as a backhaul link, midhaul link, and/or fronthaul link as described herein, such as with respect to FIG. 2. The processing system 1005 may be configured to perform processing functions for the communications device 1000, including processing signals received and/or to be transmitted by the communications device 1000.

The processing system 1005 includes one or more processors 1010. In various aspects, one or more processors 1010 may be representative of one or more of receive processor 338, transmit processor 320, TX MIMO processor 330, and/or controller/processor 340, as described with respect to FIG. 3. The one or more processors 1010 are coupled to a computer-readable medium/memory 1025 via a bus 1040. In certain aspects, the computer-readable medium/memory 1025 is configured to store instructions (e.g., computer-executable code) that when executed by the one or more processors 1010, cause the one or more processors 1010 to perform the method 800 described with respect to FIG. 8, or any aspect related to it. Note that reference to a processor of communications device 1000 performing a function may include one or more processors 1010 of communications device 1000 performing that function.

In the depicted example, the computer-readable medium/memory 1025 stores code (e.g., executable instructions), such as code for transmitting 1030 and code for obtaining 1035. Processing of the code for transmitting 1030 and code for obtaining 1035 may cause the communications device 1000 to perform the method 800 described with respect to FIG. 8, or any aspect related to it.

The one or more processors 1010 include circuitry configured to implement (e.g., execute) the code stored in the computer-readable medium/memory 1025, including circuitry such as circuitry for transmitting 1015 and circuitry for obtaining 1020. Processing with circuitry for transmitting 1015 and circuitry for obtaining 1020 may cause the communications device 1000 to perform the method 800 described with respect to FIG. 8, or any aspect related to it.

Various components of the communications device 1000 may provide means for performing the method 800 described with respect to FIG. 8, or any aspect related to it. Means for transmitting, sending or outputting for transmission may include transceivers 332 and/or antenna(s) 334 of the BS 102 illustrated in FIG. 3 and/or the transceiver 1045 and the antenna 1050 of the communications device 1000 in FIG. 10. Means for receiving or obtaining may include transceivers 332 and/or antenna(s) 334 of the BS 102 illustrated in FIG. 3 and/or the transceiver 1045 and the antenna 1050 of the communications device 1000 in FIG. 10.

Example Clauses

Implementation examples are described in the following numbered clauses:

Clause 1: A method for wireless communication by a user equipment (UE), comprising: obtaining control configuration information for receiving downlink control information (DCI) for at least a first link direction and a second link direction; obtaining an indication that only traffic of the first link direction is expected to be communicated in a first period of time; performing, based on the control configuration information and the indication, a first number of blind decodes, of a total number of blind decodes, during the first period of time to receive the DCI for the first link direction; and during the first time period, refraining from performing a second number of blind decodes, of the total number of blind decodes, associated with receiving the DCI for the second link direction based on the indication that only the traffic of the first link direction is expected to be communicated in the first period of time.

Clause 2: The method of Clause 1, wherein the control configuration information comprises: an indication of one or more control resource sets (CORESETs) for receiving the DCI; an indication of one or more search space sets (SSSs) for receiving the DCI; an indication of one or more monitoring occasions for receiving the DCI; and the total number of blind decodes for receiving the DCI.

Clause 3: The method of any one of Clauses 1-2, wherein obtaining the indication that only the traffic of the first link direction is expected to be communicated in a first period of time is based on at least one of: a periodic traffic arrival times associated with the traffic of the first link direction and traffic of the second link direction; an end of bust indication associated with the traffic of the first link direction or traffic of the second link direction; a PDCCH skipping indication associated with the traffic of the first link direction or traffic of the second link direction; a discontinuous reception (DRX) media access control-control element (MAC-CE) associated with the traffic of the first link direction or traffic of the second link direction; a packet delay budget associated with the traffic of the first link direction or traffic of the second link direction; one or more retransmission timers associated with the traffic of the first link direction or traffic of the second link direction.

Clause 4: The method of any one of Clauses 1-3, further comprising communicating the traffic of the first link direction using scheduled time-frequency resources indicated in the DCI for the first link direction.

Clause 5: The method of any one of Clauses 1-4, wherein refraining from performing the second number of blind decodes comprises one of: performing zero blind decodes for receiving the DCI for the second link direction; or performing a reduced number of blind decodes, relative to the second number of blind decodes, for receiving the DCI for the second link direction.

Clause 6: The method of any one of Clauses 1-5, further comprising receiving additional configuration information from a network entity indicating to refrain from performing the second number of blind decodes during the first period of time when the UE obtains the indication that only the traffic of the first link direction is expected to be communicated in the first period of time.

Clause 7: The method of any one of Clauses 1-6, further comprising receiving the DCI for the first link direction based on the performing the first number of blind decodes, wherein, based on only the traffic of the first link direction being expected to be communicated in the first period of time, one or more bits included in a DCI format identifier field of the DCI for the first link direction carry information for one or more other fields of the DCI for the first link direction.

Clause 8: The method of Clause 7, wherein the one or more other fields comprise at least one of: a time domain resource allocation (TDRA) field; or a frequency domain resource allocation (FDRA) field.

Clause 9: The method of Clause 7, wherein the one or more bits included in the DCI format identifier field carry information related to transmit power control.

Clause 10: The method of any one of Clauses 6-9, wherein: the UE is configured to transmit feedback information for the DCI for the first link direction, and based on the UE being configured to transmit the feedback information for the DCI for the first link direction, the one or more bits included in the DCI format identifier field of the DCI for the first link direction carry the information for one or more other fields.

Clause 11: The method of any one of Clauses 6-10, further comprising receiving the indication indicating that only the traffic of the first link direction is to be expected to be communicated in the first period of time.

Clause 12: The method of Clause 11, wherein the one or more bits included in the DCI format identifier field of the DCI for the first link direction carry the information for one or more other fields further based on the indication indicating that only the traffic of the first link direction is to be expected to be communicated in the first period of time.

Clause 13: The method of Clause 7, wherein the one or more bits included in the DCI format identifier field of the DCI for the first link direction carry the information for one or more other fields further based on the first number of blind decodes being assigned to the DCI for the first link direction and the second number of blind decodes being assigned to the DCI for the second link direction.

Clause 14: The method of any one of Clauses 1-13, further comprising: performing, based on the control configuration information, the first number of blind decodes to receive the DCI for the first link direction for the first link direction during a second period of time that does not overlap with the first period of time; and performing, based on the control configuration information, the second number of blind decodes to receive the DCI for the second link direction for the second link direction during the second period of time.

Clause 15: The method of any one of Clauses 1-14, wherein one of: the first link direction comprises a downlink direction and the second link direction comprises an uplink direction, or the first link direction comprises an uplink direction and the second link direction comprises a downlink direction.

Clause 16: A method for wireless communication by a network entity, comprising: transmitting, to a user equipment (UE), control configuration information for receiving downlink control information (DCI) for at least a first link direction and a second link direction; obtaining an indication that only traffic of the first link direction is expected to be communicated in a first period of time; and transmitting DCI for the first link direction, wherein, based on the indication that only the traffic of the first link direction is expected to be communicated in the first period of time, the DCI for the first link direction comprises a DCI format identifier field that includes one or more bits carrying information for one or more other fields of the DCI for the first link direction.

Clause 17: The method of Clause 16, wherein the control configuration information comprises: an indication of one or more control resource sets (CORESETs) for receiving the DCI; an indication of one or more search space sets (SSSs) for receiving the DCI; an indication of one or more monitoring occasions for receiving the DCI; and the total number of blind decodes for receiving the DCI.

Clause 18: The method of any one of Clauses 16-17, wherein obtaining the indication that only the traffic of the first link direction is expected to be communicated in a first period of time is based on at least one of: a periodic traffic arrival times associated with the traffic of the first link direction and traffic of the second link direction; an end of bust indication associated with the traffic of the first link direction or traffic of the second link direction; a PDCCH skipping indication associated with the traffic of the first link direction or traffic of the second link direction; a discontinuous reception (DRX) media access control-control element (MAC-CE) associated with the traffic of the first link direction or traffic of the second link direction; a packet delay budget associated with the traffic of the first link direction or traffic of the second link direction; one or more retransmission timers associated with the traffic of the first link direction or traffic of the second link direction.

Clause 19: The method of any one of Clauses 16-18, wherein the one or more other fields comprise at least one of: a time domain resource allocation (TDRA) field; or a frequency domain resource allocation (FDRA) field.

Clause 20: The method of any one of Clauses 16-19, wherein the one or more bits included in the DCI format identifier field carry information related to transmit power control.

Clause 21: The method of any one of Clauses 16-20, wherein: the network entity is configured to receive feedback information for the DCI for the first link direction; and based on the network entity being configured to receive the feedback information for the DCI for the first link direction, the one or more bits included in the DCI format identifier field of the DCI for the first link direction carry the information for one or more other fields.

Clause 22: The method of any one of Clauses 16-21, further comprising transmitting, to the UE, the indication that only the traffic of the first link direction is to be expected to be communicated in the first period of time.

Clause 23: The method of Clause 22, wherein the one or more bits included in the DCI format identifier field of the DCI for the first link direction carry the information for one or more other fields further based on the indication indicating that only the traffic of the first link direction is to be expected to be communicated in the first period of time.

Clause 24: The method of any one of Clauses 16-23, wherein the one or more bits included in the DCI format identifier field of the DCI for the first link direction carry the information for one or more other fields further based on the first number of blind decodes being assigned to scheduling grants for the first link direction and the second number of blind decodes being assigned scheduling grants for the second link direction.

Clause 25: The method of any one of Clauses 16-24, wherein one of: the first link direction comprises a downlink direction and the second link direction comprises an uplink direction, or the first link direction comprises an uplink direction and the second link direction comprises a downlink direction.

Clause 24: An apparatus, comprising: a memory comprising executable instructions; and a processor configured to execute the executable instructions and cause the apparatus to perform a method in accordance with any one of Clauses 1-23.

Clause 25: An apparatus, comprising means for performing a method in accordance with any one of Clauses 1-23.

Clause 26: A non-transitory computer-readable medium comprising executable instructions that, when executed by a processor of an apparatus, cause the apparatus to perform a method in accordance with any one of Clauses 1-23.

Clause 27: A computer program product embodied on a computer-readable storage medium comprising code for performing a method in accordance with any one of Clauses 1-23.

Additional Considerations

The preceding description is provided to enable any person skilled in the art to practice the various aspects described herein. The examples discussed herein are not limiting of the scope, applicability, or aspects set forth in the claims. Various modifications to these aspects will be readily apparent to those skilled in the art, and the general principles defined herein may be applied to other aspects. For example, changes may be made in the function and arrangement of elements discussed without departing from the scope of the disclosure. Various examples may omit, substitute, or add various procedures or components as appropriate. For instance, the methods described may be performed in an order different from that described, and various actions may be added, omitted, or combined. Also, features described with respect to some examples may be combined in some other examples. For example, an apparatus may be implemented or a method may be practiced using any number of the aspects set forth herein. In addition, the scope of the disclosure is intended to cover such an apparatus or method that is practiced using other structure, functionality, or structure and functionality in addition to, or other than, the various aspects of the disclosure set forth herein. It should be understood that any aspect of the disclosure disclosed herein may be embodied by one or more elements of a claim.

The various illustrative logical blocks, modules and circuits described in connection with the present disclosure may be implemented or performed with a general purpose processor, a digital signal processor (DSP), an ASIC, a field programmable gate array (FPGA) or other programmable logic device (PLD), discrete gate or transistor logic, discrete hardware components, or any combination thereof designed to perform the functions described herein. A general-purpose processor may be a microprocessor, but in the alternative, the processor may be any commercially available processor, controller, microcontroller, or state machine. A processor may also be implemented as a combination of computing devices, e.g., a combination of a DSP and a microprocessor, a plurality of microprocessors, one or more microprocessors in conjunction with a DSP core, a system on a chip (SoC), or any other such configuration.

As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

As used herein, the term "determining" encompasses a wide variety of actions. For example, "determining" may include calculating, computing, processing, deriving, investigating, looking up (e.g., looking up in a table, a database or another data structure), ascertaining and the like. Also, "determining" may include receiving (e.g., receiving information), accessing (e.g., accessing data in a memory) and the like. Also, "determining" may include resolving, selecting, choosing, establishing and the like.

The methods disclosed herein comprise one or more actions for achieving the methods. The method actions may be interchanged with one another without departing from the scope of the claims. In other words, unless a specific order of actions is specified, the order and/or use of specific actions may be modified without departing from the scope of the claims. Further, the various operations of methods described above may be performed by any suitable means capable of performing the corresponding functions. The means may include various hardware and/or software component(s) and/or module(s), including, but not limited to a circuit, an application specific integrated circuit (ASIC), or processor.

The following claims are not intended to be limited to the aspects shown herein, but are to be accorded the full scope consistent with the language of the claims. Within a claim, reference to an element in the singular is not intended to mean "one and only one" unless specifically so stated, but rather "one or more." Unless specifically stated otherwise, the term "some" refers to one or more. No claim element is to be construed under the provisions of 35 U.S.C. § 112 (f) unless the element is expressly recited using the phrase "means for". All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims.

What is claimed is:

1. A method for wireless communication by a user equipment (UE), comprising:

obtaining control configuration information for receiving downlink control information (DCI) for at least a first link direction and a second link direction;

obtaining an indication that only traffic of the first link direction is expected to be communicated in a first period of time;

performing, based on the control configuration information and the indication, a first number of blind decodes, of a total number of blind decodes, during the first period of time to receive the DCI for the first link direction; and during the first time period, refraining from performing a second number of blind decodes, of the total number of blind decodes, associated with receiving the DCI for the second link direction based on the indication that only the traffic of the first link direction is expected to be communicated in the first period of time;

wherein, based on only the traffic of the first link direction being expected to be communicated in the first period of time, one or more bits included in a DCI format identifier field of the DCI for the first link direction carry information for one or more other fields of the DCI for the first link direction;

wherein:

the one or more other fields comprise at least one of:

a time domain resource allocation (TDRA) field; or a frequency domain resource allocation (FDRA) field; or the one or more bits included in the DCI format identifier field carry information related to transmit power control.

2. The method of claim 1, wherein the control configuration information comprises:

an indication of one or more control resource sets (CORE-SETs) for receiving the DCI;

an indication of one or more search space sets (SSSs) for receiving the DCI;

an indication of one or more monitoring occasions for receiving the DCI; and the total number of blind decodes for receiving the DCI.

3. The method of claim 1, wherein obtaining the indication that only the traffic of the first link direction is expected to be communicated in a first period of time is based on at least one of:

a periodic traffic arrival times associated with the traffic of the first link direction and traffic of the second link direction;

an end of bust indication associated with the traffic of the first link direction or traffic of the second link direction;

a PDCCH skipping indication associated with the traffic of the first link direction or traffic of the second link direction;

a discontinuous reception (DRX) media access control-control element (MAC-CE) associated with the traffic of the first link direction or traffic of the second link direction;

a packet delay budget associated with the traffic of the first link direction or traffic of the second link direction;

one or more retransmission timers associated with the traffic of the first link direction or traffic of the second link direction.

4. The method of claim 1, further comprising communicating the traffic of the first link direction using scheduled time-frequency resources indicated in the DCI for the first link direction.

5. The method of claim 1, wherein refraining from performing the second number of blind decodes comprises one of:

performing zero blind decodes for receiving the DCI for the second link direction; or performing a reduced number of blind decodes, relative to the second number of blind decodes, for receiving the DCI for the second link direction.

6. The method of claim 1, further comprising receiving additional configuration information from a network entity indicating to refrain from performing the second number of blind decodes during the first period of time when the UE obtains the indication that only the traffic of the first link direction is expected to be communicated in the first period of time.

7. The method of claim 1, further comprising receiving the DCI for the first link direction based on the performing the first number of blind decodes.

8. The method of claim 7, wherein:

the UE is configured to transmit feedback information for the DCI for the first link direction; and based on the UE being configured to transmit the feedback information for the DCI for the first link direction, the one or more bits included in the DCI format identifier field of the DCI for the first link direction carry the information for one or more other fields.

9. The method of claim 7, further comprising receiving the indication indicating that only the traffic of the first link direction is to be expected to be communicated in the first period of time.

10. The method of claim 9, wherein the one or more bits included in the DCI format identifier field of the DCI for the first link direction carry the information for one or more other fields further based on the indication indicating that only the traffic of the first link direction is to be expected to be communicated in the first period of time.

11. The method of claim 7, wherein the one or more bits included in the DCI format identifier field of the DCI for the first link direction carry the information for one or more other fields further based on the first number of blind decodes being assigned to the DCI for the first link direction and the second number of blind decodes being assigned to the DCI for the second link direction.

12. A method for wireless communication by a user equipment (UE), comprising:

obtaining control configuration information for receiving downlink control information (DCI) for at least a first link direction and a second link direction;

obtaining an indication that only traffic of the first link direction is expected to be communicated in a first period of time;

performing, based on the control configuration information and the indication, a first number of blind decodes, of a total number of blind decodes, during the first period of time to receive the DCI for the first link direction; and during the first time period, refraining from performing a second number of blind decodes, of the total number of blind decodes, associated with receiving the DCI for the second link direction based on the indication that only the traffic of the first link direction is expected to be communicated in the first period of time;

performing, based on the control configuration information, the first number of blind decodes to receive the DCI for the first link direction during a second period of time that does not overlap with the first period of time; and performing, based on the control configuration information, the second number of blind decodes to receive the DCI for the second link direction during the second period of time.

13. The method of claim 1, wherein one of:

the first link direction comprises a downlink direction and the second link direction comprises an uplink direction; or the first link direction comprises an uplink direction and the second link direction comprises a downlink direction.

14. A method for wireless communication by a network entity, comprising:

transmitting, to a user equipment (UE), control configuration information for receiving downlink control information (DCI) for at least a first link direction and a second link direction;

obtaining an indication that only traffic of the first link direction is expected to be communicated in a first period of time; and transmitting DCI for the first link direction, wherein, based on the indication that only the traffic of the first link direction is to be expected to be communicated in the first period of time, the DCI for the first link direction comprises a DCI format identifier field that includes one or more bits carrying information for one or more other fields of the DCI for the first link direction;

wherein:

the one or more other fields comprise at least one of:

a time domain resource allocation (TDRA) field; or a frequency domain resource allocation (FDRA) field; or the one or more bits included in the DCI format identifier field carry information related to transmit power control.

15. The method of claim 14, wherein the control configuration information comprises:

an indication of one or more control resource sets (CORE-SETs) for receiving the DCI;

an indication of one or more search space sets (SSSs) for receiving the DCI;

an indication of one or more monitoring occasions for receiving the DCI; and the total number of blind decodes for receiving the DCI.

16. The method of claim 14, wherein obtaining the indication that only the traffic of the first link direction is expected to be communicated in a first period of time is based on at least one of:

a periodic traffic arrival times associated with the traffic of the first link direction and traffic of the second link direction;

an end of bust indication associated with the traffic of the first link direction or traffic of the second link direction;

a PDCCH skipping indication associated with the traffic of the first link direction or traffic of the second link direction;

a discontinuous reception (DRX) media access control-control element (MAC-CE) associated with the traffic of the first link direction or traffic of the second link direction;

a packet delay budget associated with the traffic of the first link direction or traffic of the second link direction;

one or more retransmission timers associated with the traffic of the first link direction or traffic of the second link direction.

17. The method of claim 14, wherein:

the network entity is configured to receive feedback information for the DCI for the first link direction; and based on the network entity being configured to receive the feedback information for the DCI for the first link direction, the one or more bits included in the DCI format identifier field of the DCI for the first link direction carry the information for one or more other fields.

18. The method of claim 14, further comprising transmitting, to the UE, the indication that only the traffic of the first link direction is to be expected to be communicated in the first period of time.

19. The method of claim 18, wherein the one or more bits included in the DCI format identifier field of the DCI for the first link direction carry the information for one or more other fields further based on the indication indicating that only the traffic of the first link direction is to be expected to be communicated in the first period of time.

20. The method of claim 14, wherein the one or more bits included in the DCI format identifier field of the DCI for the first link direction carry the information for one or more other fields further based on the first number of blind decodes being assigned to scheduling grants for the first link direction and the second number of blind decodes being assigned scheduling grants for the second link direction.

21. The method of claim 14, wherein one of:

the first link direction comprises a downlink direction and the second link direction comprises an uplink direction; or the first link direction comprises an uplink direction and the second link direction comprises a downlink direction.

22. A user equipment (UE), comprising:

a memory comprising executable instructions; and a processor configured to execute the executable instructions and cause the UE to:

obtain control configuration information for receiving downlink control information (DCI) for at least a first link direction and a second link direction;

obtain an indication that only traffic of the first link direction is expected to be communicated in a first period of time;

perform, based on the control configuration information and the indication, a first number of blind decodes, of a total number of blind decodes, during the first period of time to receive the DCI for the first link direction; and during the first time period, refrain from performing a second number of blind decodes, of the total number of blind decodes, associated with receiving the DCI for the second link direction based on the indication that only the traffic of the first link direction is expected to be communicated in the first period of time;

wherein, based on only the traffic of the first link direction being expected to be communicated in the first period of time, one or more bits included in a DCI format identifier field of the DCI for the first link direction carry information for one or more other fields of the DCI for the first link direction;

wherein:

the one or more other fields comprise at least one of:

a time domain resource allocation (TDRA) field; or a frequency domain resource allocation (FDRA) field; or the one or more bits included in the DCI format identifier field carry information related to transmit power control.

23. The UE of claim 22, wherein the processor is configured to cause the UE to obtain the indication that only the traffic of the first link direction is expected to be communicated in a first period of time based on at least one of:

a periodic traffic arrival times associated with the traffic of the first link direction and traffic of the second link direction;

an end of bust indication associated with the traffic of the first link direction or traffic of the second link direction;

a PDCCH skipping indication associated with the traffic of the first link direction or traffic of the second link direction;

a discontinuous reception (DRX) media access control-control element (MAC-CE) associated with the traffic of the first link direction or traffic of the second link direction;

a packet delay budget associated with the traffic of the first link direction or traffic of the second link direction;

one or more retransmission timers associated with the traffic of the first link direction or traffic of the second link direction.

24. The UE of claim 22, wherein, in order to refrain from performing the second number of blind decodes, the processor is configured to cause the UE to one of:

perform zero blind decodes for receiving the DCI for the second link direction; or perform a reduced number of blind decodes, relative to the second number of blind decodes, for receiving the DCI for the second link direction.

25. The UE of claim 22, wherein:

the processor is further configured to cause the UE to receive the DCI for the first link direction based on the performing the first number of blind decodes; and based on only the traffic of the first link direction being expected to be communicated in the first period of time, one or more bits included in a DCI format identifier field of the DCI for the first link direction carry information for one or more other fields of the DCI for the first link direction.

26. A network entity, comprising:

a memory comprising executable instructions; and a processor configured to execute the executable instructions and cause the network entity to:

transmit, to a user equipment (UE), control configuration information for receiving downlink control information (DCI) for at least a first link direction and a second link direction;

obtain an indication that only traffic of the first link direction is expected to be communicated in a first period of time; and transmit DCI for the first link direction, wherein, based on the indication that only the traffic of the first link direction is expected to be communicated in the first period of time, the DCI for the first link direction comprises a DCI format identifier field that includes one or more bits carrying information for one or more other fields of the DCI for the first link direction;

wherein:

the one or more other fields comprise at least one of:

a time domain resource allocation (TDRA) field; or a frequency domain resource allocation (FDRA) field; or the one or more bits included in the DCI format identifier field carry information related to transmit power control.

\* \* \* \* \*